(12) United States Patent
Saiz Serrano

(10) Patent No.: US 11,386,485 B2
(45) Date of Patent: Jul. 12, 2022

(54) CAPTURE DEVICE BASED CONFIDENCE INDICATOR

(71) Applicant: eBay Inc., San Jose, CA (US)

(72) Inventor: Miguel Saiz Serrano, Mountain View, CA (US)

(73) Assignee: eBay Inc., San Jose, CA (US)

( * ) Notice: Subject to any disclaimer, the term of this patent is extended or adjusted under 35 U.S.C. 154(b) by 455 days.

(21) Appl. No.: 16/564,394

(22) Filed: Sep. 9, 2019

(65) Prior Publication Data

US 2021/0073898 A1 Mar. 11, 2021

(51) Int. Cl.
| | |
|---|---|
| *G06Q 30/06* | (2012.01) |
| *G06F 16/587* | (2019.01) |
| *G06F 16/583* | (2019.01) |
| *G06T 7/00* | (2017.01) |
| *G06K 1/18* | (2006.01) |

(52) U.S. Cl.
CPC ....... *G06Q 30/0643* (2013.01); *G06F 16/583* (2019.01); *G06F 16/587* (2019.01); *G06K 1/18* (2013.01); *G06Q 30/0609* (2013.01); *G06T 7/0002* (2013.01); *G06T 7/97* (2017.01)

(58) Field of Classification Search
CPC .............................................. G06Q 30/06–08
See application file for complete search history.

(56) References Cited

U.S. PATENT DOCUMENTS

| | | | |
|---|---|---|---|
| 7,983,957 B2 | 7/2011 | Gabriel et al. | |
| 7,991,646 B2 | 8/2011 | Lewis et al. | |
| 8,854,499 B2 | 10/2014 | Rothschild | |
| 9,123,086 B1 | 9/2015 | Freeland et al. | |
| 9,483,784 B2 | 11/2016 | Raney | |
| 9,704,191 B2 | 7/2017 | Sheu et al. | |
| 2010/0024017 A1* | 1/2010 | Ashfield | G06F 21/35 726/7 |
| 2011/0292204 A1* | 12/2011 | Boncyk | G06V 40/18 348/135 |
| 2016/0087980 A1* | 3/2016 | Heo | H04W 4/48 726/4 |

OTHER PUBLICATIONS

"What is the Difference Between Hashing And Encrypting", Security Innovation Europe, Retrieved from Internet URL: https://www.securityinnovationeurope.com/blog/page/whats-the-difference-between-hashing-and-encrypting, Accessed on Dec. 2, 2019, 8 pages.
Wikipedia, "Digital Watermarking", Retrieved from Internet URL: https://en.m.wikipedia.org/wiki/Digital_watermarking, Accessed on Dec. 2, 2019, 8 pages.

* cited by examiner

*Primary Examiner* — Ming Shui
(74) *Attorney, Agent, or Firm* — Shook, Hardy & Bacon LLP

(57) ABSTRACT

Disclosed are embodiments for electronic commerce user interfaces. In some embodiments, a device is used to create an account on an electronic commerce system or create a listing for an item for sale on the ecommerce system. A first identifier of the device is stored by the ecommerce system. When a listing is generated by the account, an image representing an item for sale is included as part of the listing. The disclosed embodiments compare a second device identifier of a device used to capture the image with the first device identifier. If the two identifiers identify the same device, this provides an indication of confidence that the seller is in possession of the item represented by the image. This indication of confidence is then displayed when the listing is displayed to prospective buyers.

20 Claims, 16 Drawing Sheets

700

CAPTURE DEVICE BASED CONFIDENCE INDICATOR

TECHNICAL FIELD

The present disclosure generally relates to electronic security. In particular, the disclosed embodiments function to improve security of an electronic marketplace based on a validation of an image capture device.

BACKGROUND

Electronic commerce has gained substantial market share during the past decade. Use of electronic commerce provides many benefits when compared to traditional brick and mortar shopping. With electronic commerce, the variety of goods can be much greater than that typically found via traditional brick and mortar shopping. Use of electronic commerce can also be more efficient and thus more environmentally conscious. For example, use of electronic commerce can reduce the use of carbon-based transportation to physically transport buyers to one or more remotely located brick and mortar location. This reduction in transportation can result in reduced greenhouse gas emissions. One inhibitor to further adoption of electronic commerce by consumers, is a perception of risk by buyers. This perception of risk is particularly acute when considering more expensive items for purchase via ecommerce. While buyers may perceive some risk when purchasing from well-known sellers, the risk is compounded when a large purchase from a lesser known seller is considered. Therefore, improved methods of increasing buyer confidence in electronic commerce are desired.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

Various ones of the appended drawings merely illustrate example embodiments of the present disclosure and cannot be considered as limiting its scope.

DETAILED DESCRIPTION

Figure 1:
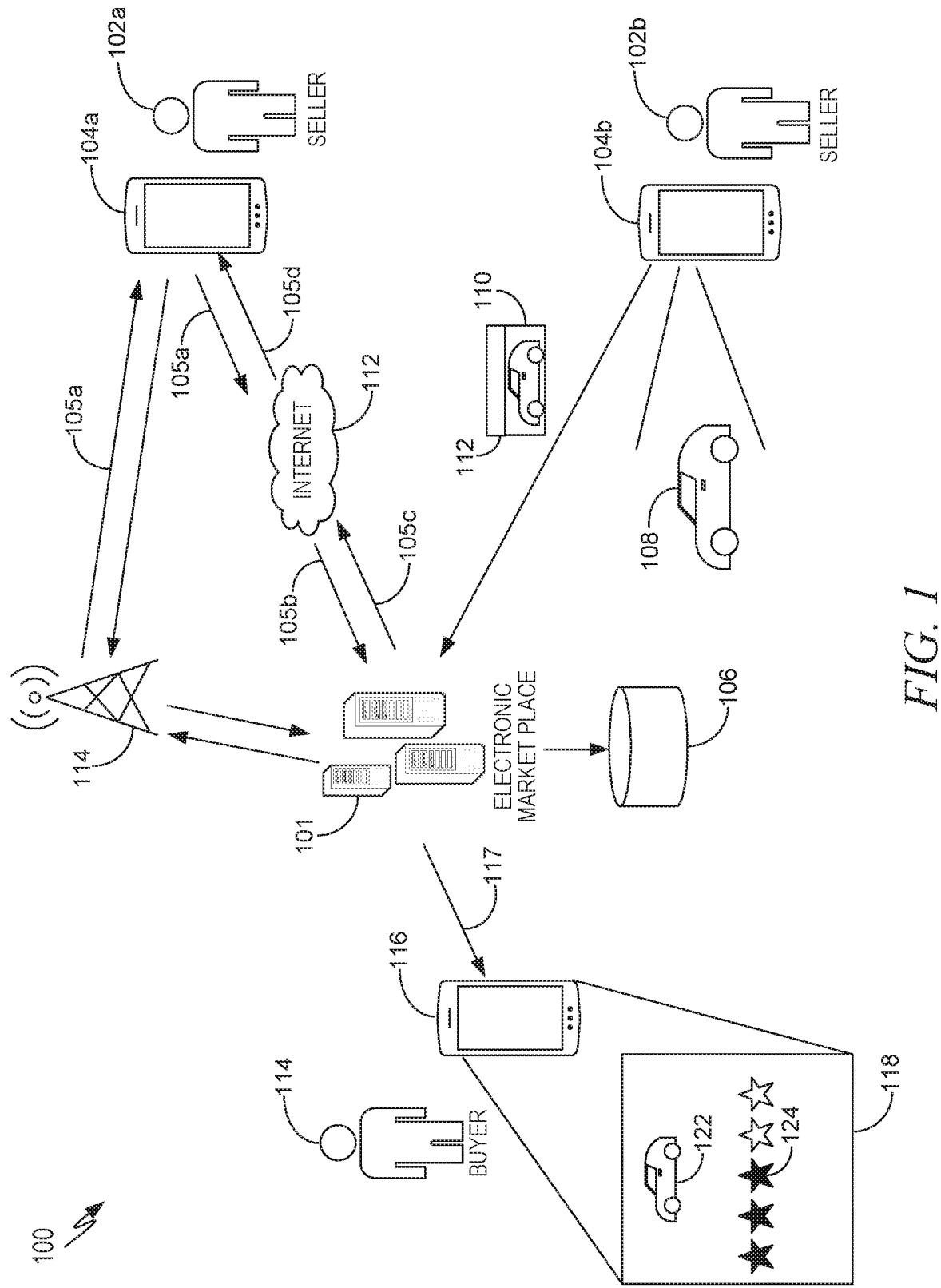
FIG. 1 is an overview diagram of an electronic commerce system that may be implemented in one or more of the disclosed embodiments.

Reference will now be made in detail to specific example embodiments for carrying out the inventive subject matter. Examples of these specific embodiments are illustrated in the accompanying drawings. It will be understood that these examples are not intended to limit the scope of the claims to the illustrated embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details.

As discussed above, one barrier to further adoption of electronic commerce is a buyer's perception of risk in the transaction. This perception of risk may arise from one or more factors, including a risk that the seller is fraudulent. For example, one known fraudulent ecommerce technique is for a fraudulent seller to post photos of an item for sale that the seller does not own. The fraudulent seller may obtain the photos from other, non-fraudulent ecommerce listings posted on the same ecommerce site or even a different ecommerce site. In some cases, descriptions of the item may also be copied from a valid listing by the fraudulent seller and included in a fraudulent listing. After the fraudulent seller receives payment, there is generally no response. An account used by the fraudulent seller on an electronic commerce site may become abandoned leaving little recourse for the buyer.

The disclosed embodiments provide for improved verification of sellers and items listed by sellers on an electronic marketplace. Some of the disclosed embodiments provide for a seller account to be established on an electronic marketplace. The seller account is established by a seller using a first seller device. Establishment of the account may include one or more validation methods to increase the probability that the seller establishing the account is providing valid identification information. For example, during an account initialization process, a seller may be prompted for information defining an additional communication channel between the electronic marketplace and the seller. For example, the seller may be asked to provide a phone number or physical address where they can be contacted. A separate verification message is then sent to the seller via the specified second communication channel. Upon receiving a valid response from the seller via the second communication channel, the seller account is established. This additional communication channel presents a barrier to creation of a fraudulent account and provide some additional evidence that the identity information provided during establishment of the seller account is valid.

Later, the seller creates a listing to sell an item. The listing includes at least one image of the item. In some embodiments, an image file provided by the seller for the listing may include metadata identifying a device capturing the image. For example, some image capture devices record a device identifier uniquely identifying the device capturing the image in the metadata In some other embodiments, the seller may utilize a mobile device application published by the electronic marketplace that facilitates image capture for item listings. The mobile device application is configured to store a device identifier of the device capturing the image as part of a stored image file representing the item for sale.

The disclosed embodiments then compare the device identifier of a device that captured the image with a second device identifier used to create the seller's account. A result of this comparison is an indication that the seller is in physical possession of the item listed for sale. An indication of the comparison may be displayed on a user interface presented to a potential buyer of the item. By viewing the indication (a confidence indictor), a buyer may be provided with an increased confidence that the seller is in possession of the item for sale, and may be more likely to proceed with the transaction. In some embodiments, a device capturing the image digitally signs a resulting image file, providing increased confidence that the device indicated in the image was in fact the device that captured the image. Some of the disclosed embodiments may further consider this digital signature when determining the indication for presentation of the user interface.

In some embodiments, the indication of the comparison is combined with other comparisons to generate an aggregated confidence index for an image. A displayed confidence indicator is then based on the confidence index. In some embodiments, a capture time of an image may be stored in image metadata of an image file. Alternatively, as discussed above, use of a seller application may provide for recordation of a time of image capture when the image is captured via the seller application. Some embodiments compare this image capture time with a present time or a time at which a listing is created. A result of this comparison may be considered when generating the aggregated confidence index. In some embodiments, an elapsed time greater than a predetermined threshold elapsed time between image capture and listing creation may indicate a relative reduction in confidence that the seller is in possession of the image represented by the image. An elapsed time lower than a second predetermined threshold is an indicator of relative increased confidence that the seller is in possession of the image represented by the image.

In some embodiments, a location of image capture is included in metadata of an image representing an item. In embodiments using the seller application, the seller application is configured in these embodiments to record the location of image capture. The disclosed embodiments then compare the image capture location to a seller location specified when the seller account was established. A distance between the image capture location and the seller's account location is considered an indicator of seller risk in these embodiments. These embodiments may incorporate the distance into the aggregated confidence index discussed above. In some embodiments a type of image file representing the item available for sale may also influence the aggregated confidence index. A seller account may also include reputation information, such as a history of previously completed transactions, buyer feedback, and other reputation information that may be available on the seller from resources other than the electronic marketplace. In some embodiments, the confidence index may incorporate the seller's reputation.

In some embodiments, the seller application displays a first QR code and further prompts the seller to capture an image of an item available for sale so as to include the displayed first QR code in the image. The seller may first print the displayed first QR code, then position the print out to be within an image frame captured by the seller, with the image frame also capturing an item to be listed for sale. Either the seller application or the electronic marketplace then analyzes the image to identify a second QR code. If the first QR code and second QR code match, the match provides an additional indication that the seller is in possession of the item available for sale. In some embodiments, the image may be further analyzed to detect attempts to edit the image to include the second QR code. Any detection of such efforts may be used by the disclosed embodiments to negatively adjust the aggregated indication of seller confidence.

These various indicators of seller confidence may be assigned different weights when determining the confidence index.

FIG. 1 is an overview diagram of an electronic commerce system 100 that may be implemented in one or more of the disclosed embodiments. The electronic commerce system 100 includes an electronic marketplace application 101. The electronic commerce system 101 provides listings of items available for sale. The listings are created by sellers and may be viewed by potential buyers. FIG. 1 illustrates a single seller 102, shown twice in FIG. 1 at two different points in time as seller 102a and 102b. The seller is associated with a single seller device, also shown twice in FIG. 1 at the two different points in time as seller device 104a and 104b. The seller device 104 interfaces with the electronic marketplace 101 via the internet 112. The seller device 104 is used to establish a seller account on the electronic marketplace 101 via communications 105a-d. During the communications 105a-d, the seller device 104 transmits an identification of the seller device 104 to the electronic marketplace 101. The electronic marketplace 101 stores an association between the established seller account and the seller device 104a in a datastore 106.

At some time later, the seller 102 captures an image of an item 108. The seller may intend to list the item 108 for sale on the electronic marketplace 101. The seller 102 may capture an image of the item 108 using an application native to an operating system on the seller device 104. In other embodiments, the seller 102 may utilize a seller application (not shown) running on the seller device 104. The seller application may capture the image of the item 108 in these embodiments. The seller device 104 then uploads an image 110 of the item 108. The image 110 includes metadata 112. The metadata 112 stores information identifying the seller device 104 as the device that captured the image 110. The metadata 112 may store additional information including a time of the capture of image 110, a location of the seller device 104 when it captured the image 110, a digital signature generated by the seller device 104, and/or additional information. While FIG. 1 represents the metadata 112 as being physically a part of the image 110, in some embodiments, the image metadata 112 is completely separate, both logically and physically from the image 110. For example, in some embodiments, the image metadata 112 is written to the data store 106 by the seller device 104.

Upon receiving the image 110 including the metadata 112, the electronic marketplace 101 compares information included in the metadata 112 with information received from the seller device 104 when the seller account was created. For example, the electronic marketplace 101 may compare capture device identification information included in the metadata 112 with second device identification information received when the seller account was created. The electronic marketplace 101 may further compare capture location information for the image 110 as specified in the metadata 112 with location information for the seller's account. A result of these one or more comparisons may provide for an indication of credibility or trustworthiness of the seller 102. For example, if the capture device is equivalent to the device used to create the seller's account, this tends to provide for a relative increase is an indication of seller credibility or trustworthiness. Similarly, if the capture location of the image 110 is within a threshold distance of a location of the seller device 104 when the seller account was created, this also provides a positive indication of seller trustworthiness and/or seller credibility.

Some of the disclosed embodiments aggregate multiple indications of seller credibility to generate the confidence index discussed above.

FIG. 1 also shows a buyer 114 and buyer device 116. The buyer 114 may browse or search for listings of items available for sale on the electronic marketplace 101 using the buyer device 116. The electronic marketplace 101 causes display of a listing on a display of the buyer device 116 via communication flow 117. If a listing for the item 108 is displayed on the buyer device 116, the electronic marketplace 101 may further cause display of an indication of seller confidence or trustworthiness. This is shown in the expanded view of a buyer device display, shown in FIG. 1 as expanded view 118. The expanded view 118 shows an image 122 of the item 108 and an indicator 124 of seller trustworthiness 124. The indicator 124 of seller trustworthiness is based on one or more comparisons of image metadata 112 to one or more corresponding seller attributes of a seller account, as further discussed in more detail below.

Figure 2:
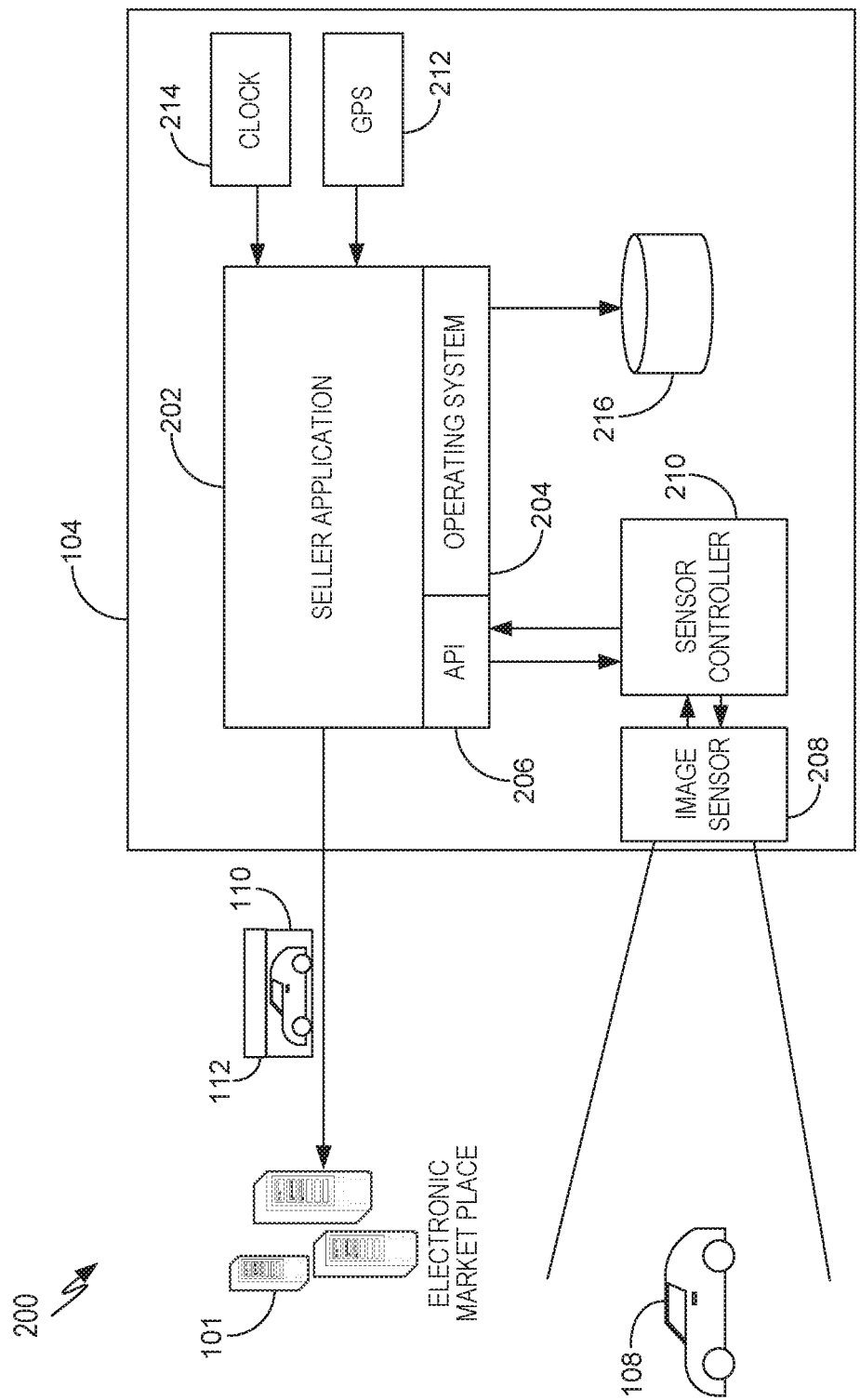
FIG. 2 is a block diagram illustrating an example of a seller device that may be implemented in one or more of the disclosed embodiments

FIG. 2 is a block diagram illustrating an example of a seller device that may be implemented in one or more of the disclosed embodiments. The seller device 104 includes a seller application 202. The seller application is configured to interface with the electronic marketplace. In some embodiments, the seller application is configured to provide for one or more of account provisioning, image capture and upload, item listing creation and management. The seller application 202 interfaces with an operation system 204 of the seller device 104. The operating system 204 includes an API 206 that provides for control of an imaging sensor 208, via a sensor control component 210, both of which are integrated into the seller device 104.

The seller application is configured to capture an image using the imaging sensor 208. For example, the seller application 202 may capture an image of the item 108 discussed above with respect to FIG. 1. The seller application 202 then uploads a resulting image 110 to the electronic marketplace 101. Because the seller application 202 is in control of the image capture process used to capture an image of the item 108, the seller application is able to confirm various characteristics of the resulting image. For example, the seller application is able to confirm an identification of the seller device 104 as the device that captured the image 110 of the item 108. For example, the seller application 202 may read one or more unique hardware identifications of the seller device 104, such as a serial number, manufacture date/time, station address, mobile device identifier, or other unique identifier of the particular seller device 104 capturing the image 110. The seller application 202 is also configured, in some embodiments, to obtain location information for the seller device 104 when the image is captured. The location information may be obtained from a positioning device 212, such as a global positioning system receiver (GPS receiver). In some embodiments, the seller application 202 is configured to read date/time information from a clock 214. The date/time information may indicate a date/time of capture of the image 110. One or more of the image 110 and image metadata 112 indicating one or more of capture device identification information, capture location information, capture date/time information may be written to a local stable storage device 216 of the seller device 104. In some embodiments, the seller application 202 digitally signs the metadata 112 or individual metadata such as the device identification, capture date/time, and/or capture location to provide additional security against any tampering of this information by the seller.

Figure 3:
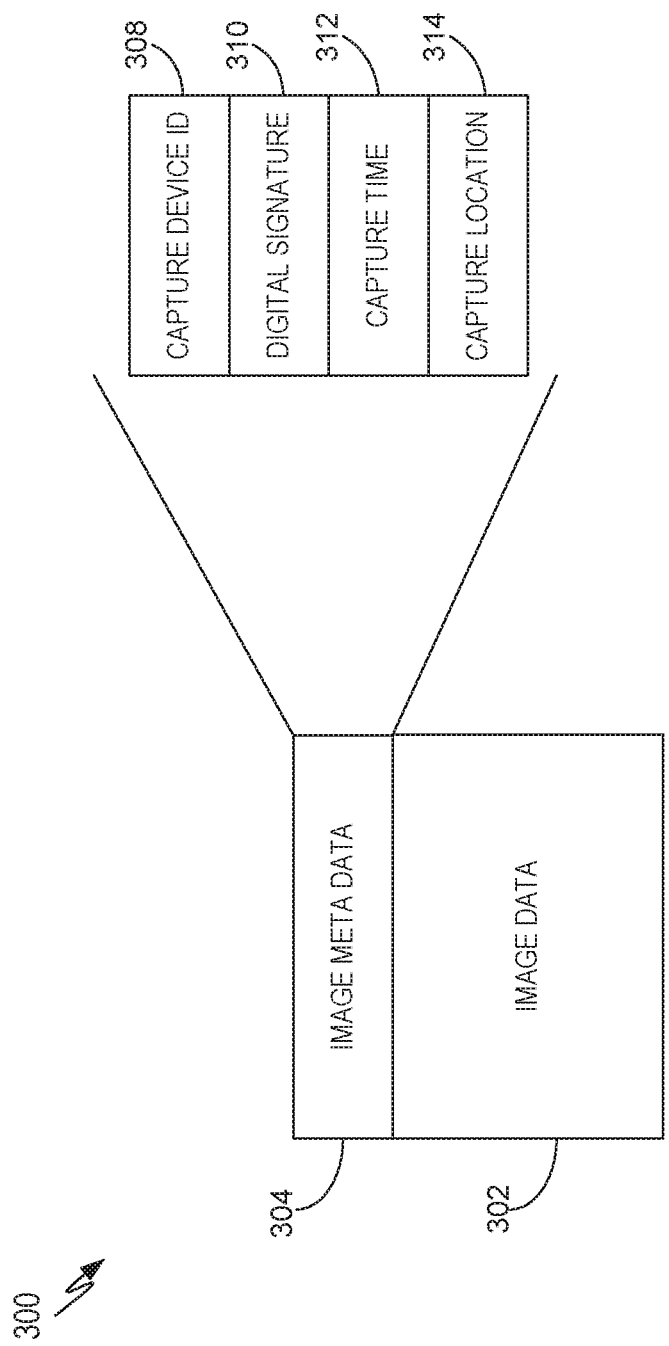
FIG. 3 is a block diagram of an example image that may be implemented in one or more of the disclosed embodiments.

FIG. 3 is a block diagram of an example image that may be implemented in one or more of the disclosed embodiments. FIG. 3 shows an image 300 includes image data 302 and metadata 304. The image data 302 defines visual aspects of the image. For example, in some embodiments, the image data 302 defines visual aspects of an item (e.g. item 108) for sale. In some embodiments, the image data 302 defines visual aspects of a QR code that is captured along with the item 108. The image meta data 304 defines one or more characteristics of the image 300. The image meta data 304 is generated by a device, such as the seller device 104 in some embodiments. While FIG. 3 shows the metadata 304 as physically adjoining the image data 302, in some embodiments, the image metadata 304 and image data 302 are stored in physically separate locations and do not represent an integrated image such as the image 300. In the disclosed embodiment of FIG. 3, the image meta data 304 defines a capture device identifier 306, digital signature 308, capture time 310, and capture location 312.

In some embodiments, the image metadata 304 may be written by the seller application 202, discussed above with respect to FIG. 2. In some embodiments, the image metadata 304 is written to the datastore 106 by the seller application 202. In some embodiments, the metadata 304 may be written by a different application, such as a photo application or even an operating system based application for a mobile device.

Figure 4:
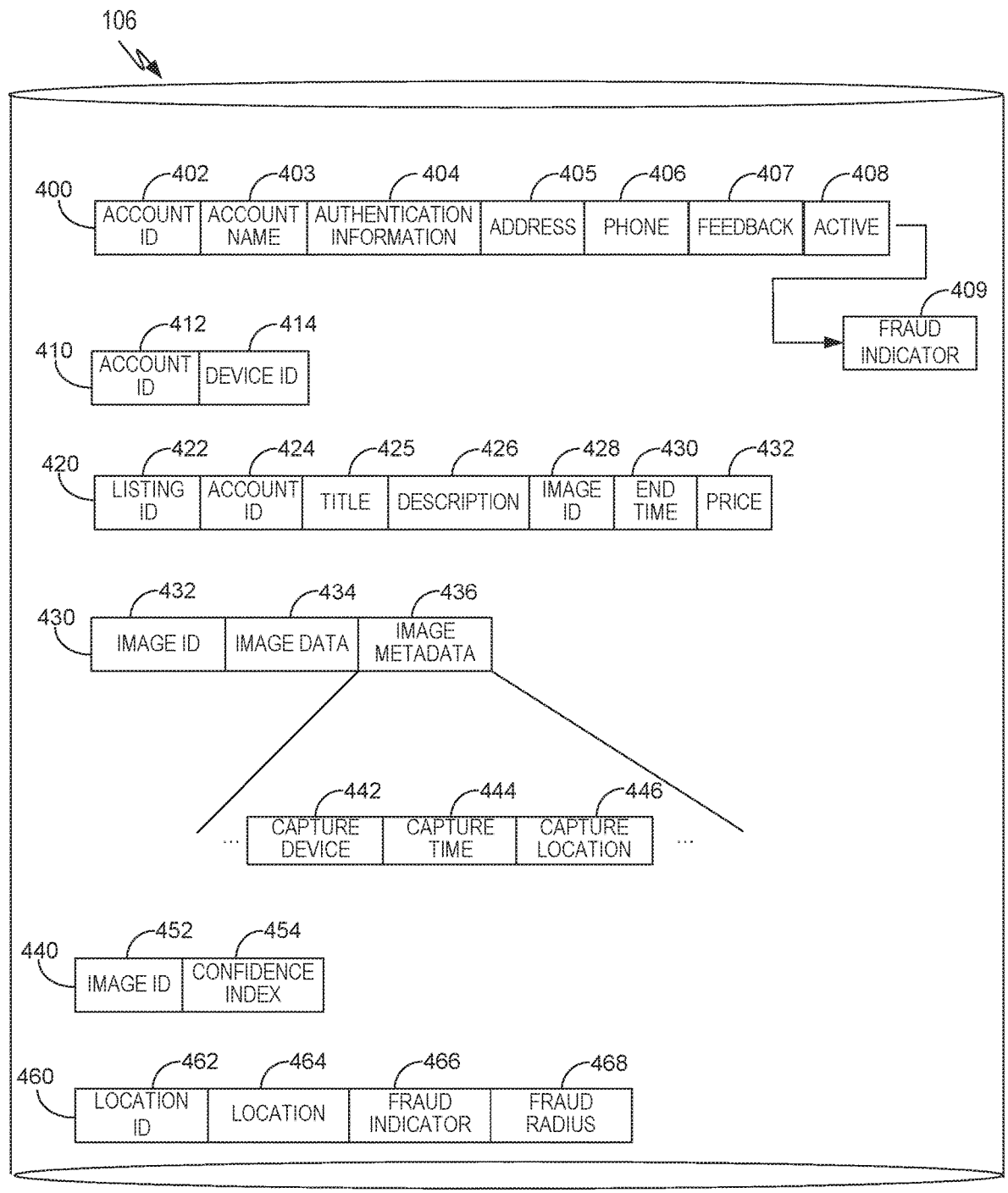
FIG. 4 shows an example of data structures that may be implemented in one or more of the disclosed embodiments

FIG. 4 shows an example of data structures that may be implemented in one or more of the disclosed embodiments. While the data structures are described below as relational database tables, one of skill in the art would understand that a variety of different data structures could be used in various embodiments. For example, various embodiments may include the use of traditional in-memory structures such as linked lists, arrays, trees, graphs or other structures, unstructured data stores, or other techniques.

FIG. 4 shows an account table 400, account device table 410, listing table 420, image table 430, confidence table 440, and location table 460. The account table 400 stores information regarding each account maintained or established by the electronic marketplace 101. The account table 400 includes an account identifier field 402, account name field 403, authentication information field 404, address field 405, phone field 406, a feedback field 407, an active flag field 408, and a fraud indicator 409. The account identifier field 402 uniquely identifies a particular account. The account name field 403 stores an account name for the account identified by the account identifier field 402. The account name may be provided as input when a session for or under the account is established. The authentication information 404 stores account authentication information, such as a password for the account identified by the account identifier field 402. The address field 405 stores a physical address associated with the account. The phone field 406 stores a phone number associated with the account. When an account is established, the disclosed embodiments may take steps to verify the address field 405 and/or phone field 406 include valid information. For example, as discussed above, when an account is established, contact with an account holder may be initiated via one or more of the address field 405 and/or phone field 406. By receiving a confirmation from the account holder via this contact information, a level of confidence in the validity of the address field 405 and/or phone field 406 is established. The feedback field 407 indicates seller feedback. For example, the feedback field 407 may indicate input received from buyers of items the account has previously listed for sale on the electronic marketplace 101. The active flag field 408 stores an indication of whether the account (specified by the account id field 402) is active or inactive. An active account can be used for purposes of the electronic marketplace 101. An inactive account cannot be used. An account is set inactive by some of the disclosed embodiments when fraudulent activity is associated with the account. The fraud indicator 409 stores an indication of any fraudulent activity performed by the account. In some aspects, the fraud indicator 409 is a count of a number of times the account has operating within a location linked to fraudulent activity. Operating within the location may include logging in to an account from a location, capturing an image from a location, or uploading an image indicating a capture location associated with fraudulent activity. The disclosed embodiments may consult the fraud activity indicator 409 to determine whether to deactivate an account (e.g. and set the active indicator 408 to indicate the deactivation.

The account device table includes an account identifier field 412 and a device identifier field 414. The account device table stores device information for devices associated with particular accounts. The account identifier field 412 uniquely identifies a particular account. The device identifier field 414 identifies a particular device that is associated with the account. A device may become associated with an account in a variety of ways. For example, if a device is used to establish the account, an association between the device and the account is recorded in the account device table 410. Some embodiments may further include work flows that provide for associating a device with an existing account. For example, as discussed below, a user interface may be provided to associate additional devices with an account. Via a verification flow, such as contacting the device via a provided phone number or other communication channel, the association may be established after the account is established.

The listing table 420 includes a listing identifier 422, account identifier 424, description field 426, image field 428, end time field 430, and price field 432. In various embodiments, one or more image fields 428 may be include in the listing table 420. The listing identifier 422 uniquely identifies a listing. A listing may be published on the electronic marketplace 101. The listing may be provided to client devices, such as the buyer device 116 and/or seller device 104, discussed above with respect to FIG. 1, when requested. Each listing in the listing table may be made available to these client devices as a result of those respective devices requesting the listing via a reference to the listing. For example, the client devices may request the listing identifier 422 in some embodiments. The account identifier field 424 identifies an account that is a seller for the listing identified by the listing identifier field 422. The listing was created under a session established for the account 424. A user associated with the account is responsible for the listing's content. The user is responsible for delivering the item that is the subject of the listing upon completion of a sale to a buyer. The description field 426 provides a text description of the item available for sale. The image id field 428 identifies an image representing the item. The end time field 430 indicates a time when the listing will end. The price field 432 indicates a price for the item. For some listings, the price field 432 indicates a fixed price for the item and in some other listings, the price field indicates a current bid price for the item.

The image table 430 includes an image identifier field 432, image data field 434, and image meta data field 436. The image identifier field 432 uniquely identifies a particular image, and may be cross referenced with the image identifier field 428. The image data field 434 stores data representing one or more visual aspects of an item for sale in a listing included in the listing table 420. The image data field 434 may store data analogous to the image data field 302, discussed above with respect to FIG. 3. The image metadata field 436 stores metadata for the image identified by the image identifier field 432. In some embodiments, the image metadata field 436 stores data analogous to that discussed above with respect to the metadata field 304. For example, FIG. 4 shows the metadata field 436 including at least a capture device field 442, capture time field 444, and capture location field 446. The confidence table 440 includes an image identifier 452 and a confidence index 454. The confidence index 454 indicates a confidence in an image identified by the image identifier field 452. The image identifier field 452 may be cross referenced with the image identifier field 432 and/or image identifier field 428.

The location table 460 includes a location identifier 462, location field 464, fraud indicator field 466, and fraud radius field 468. The location identifier 462 uniquely identifies a location being tracked for possible fraudulent activity at the location. The location field 464 identifies the location. The location field 464 stores geographic coordinates of a particular location on the planet earth in some embodiments. In other embodiments, the location field 464 stores address information. The fraud indicator field 466 indicates a degree or severity of fraud occurring within a radius of the location. In some embodiments, the fraud indicator field 466 indicates a count of a number of fraud instances occurring within a proximity of the location. In some embodiments, the fraud indicator field 466 stores a binary indicator of whether the location is considered a fraudulent location or not. The fraud radius field 468 indicates a length of a radius surrounding the location (indicated by the location field 464) that is relevant to any fraud indicated by the fraud indicator field 466. Some of the disclosed embodiments may manage display of images and/or seller accounts based on information stored in the location table 460. For example, if evidence that a particular location is used for fraudulent purposes, additional images captured at that location may be inhibited from display on the electronic marketplace 101. In some embodiments, a seller account may be deactivated if the account is associated with a location that has a previous association with fraudulent activity.

Figure 5:
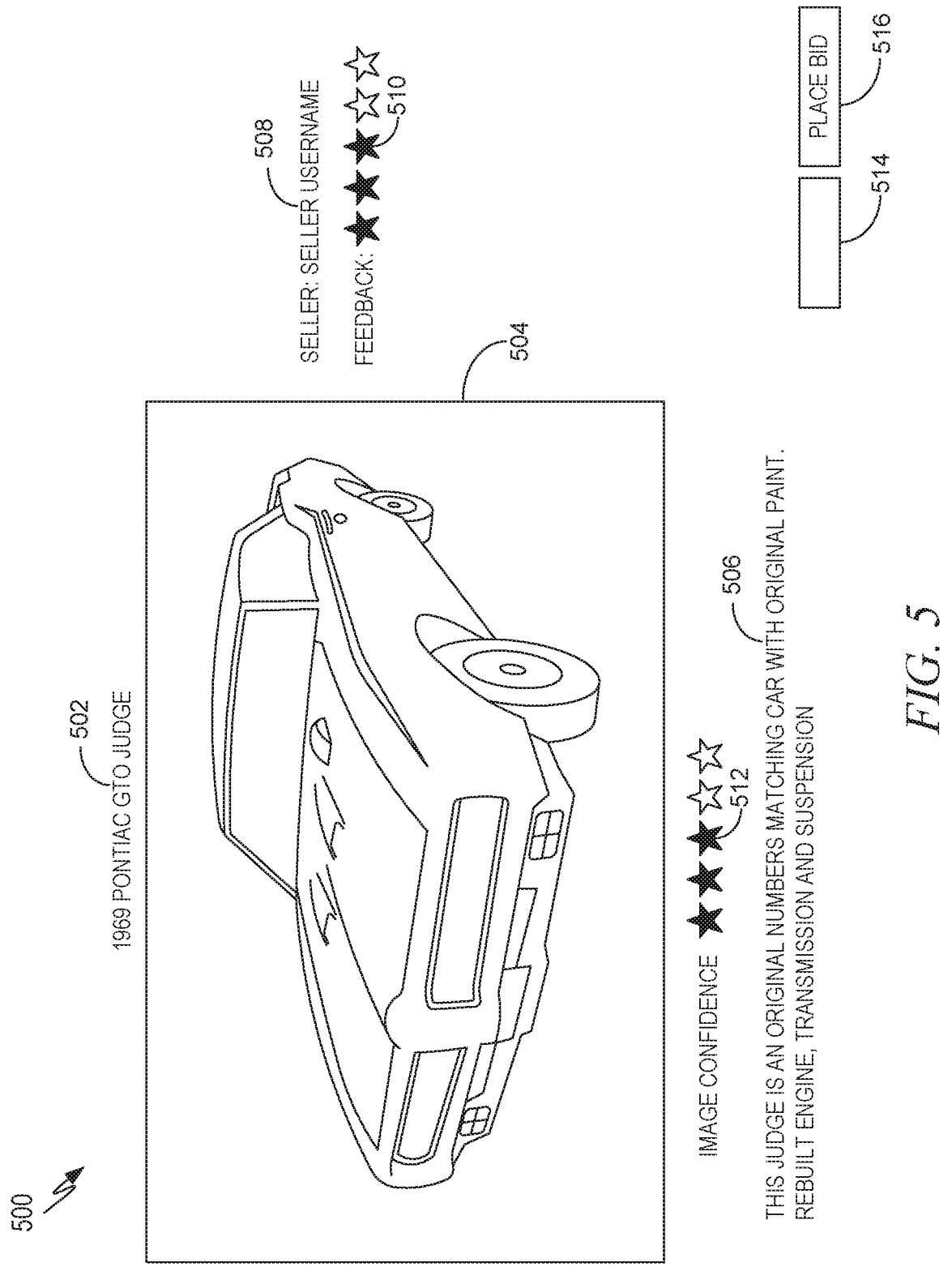
FIG. 5 shows an example user interface that may be implemented in one or more of the disclosed embodiments.

FIG. 5 shows an example user interface that may be implemented in one or more of the disclosed embodiments. The user interface 500 is displayed within a session. The session is established by entering authentication credentials of an account, such as an account of a buyer. The account credentials may include at least an account name (e.g. stored in field 403), and password (e.g. stored in field 404). The user interface 500 shown in FIG. 5 is configured to show data for a listing, such as a listing identified via the listing table 420 discussed above with respect to FIG. 4. The user interface 500 displays a title 502 for the listing. The title 502 may be based on the title field 425. The user interface 500 also displays an image 504 and a description 506. In some embodiments, the image 504 is based on the image id field 428, which identifies image data 434 in the image table 430. In some embodiments, the description 506 is based on the description field 426. The user interface is also configured to display a seller identifier 508 and a feedback rating for the seller 510. The user interface 500 is also configured to display an image confidence indicator 512. The image confidence indicator 512 is shown as a plurality of stars, with some portion of the stars populated or filled with color to designate the score. Other embodiments may use score indicators of a different design. For example, some embodiments may use color to indicate a score. For example, green may indicate high confidence (above a first threshold) and red may indicate a score below a second threshold. Yellow may indicate a score between the first and second thresholds. In some embodiments, the confidence indicator 512 is a numerical value, such as the score itself.

User interface 500 also includes a bid entry edit box 514 and a bid control 516. Input received in the bid entry edit box 514 defines a price or amount that the session account will be responsible for paying should the bid be successful at purchasing the item.

Figure 6:
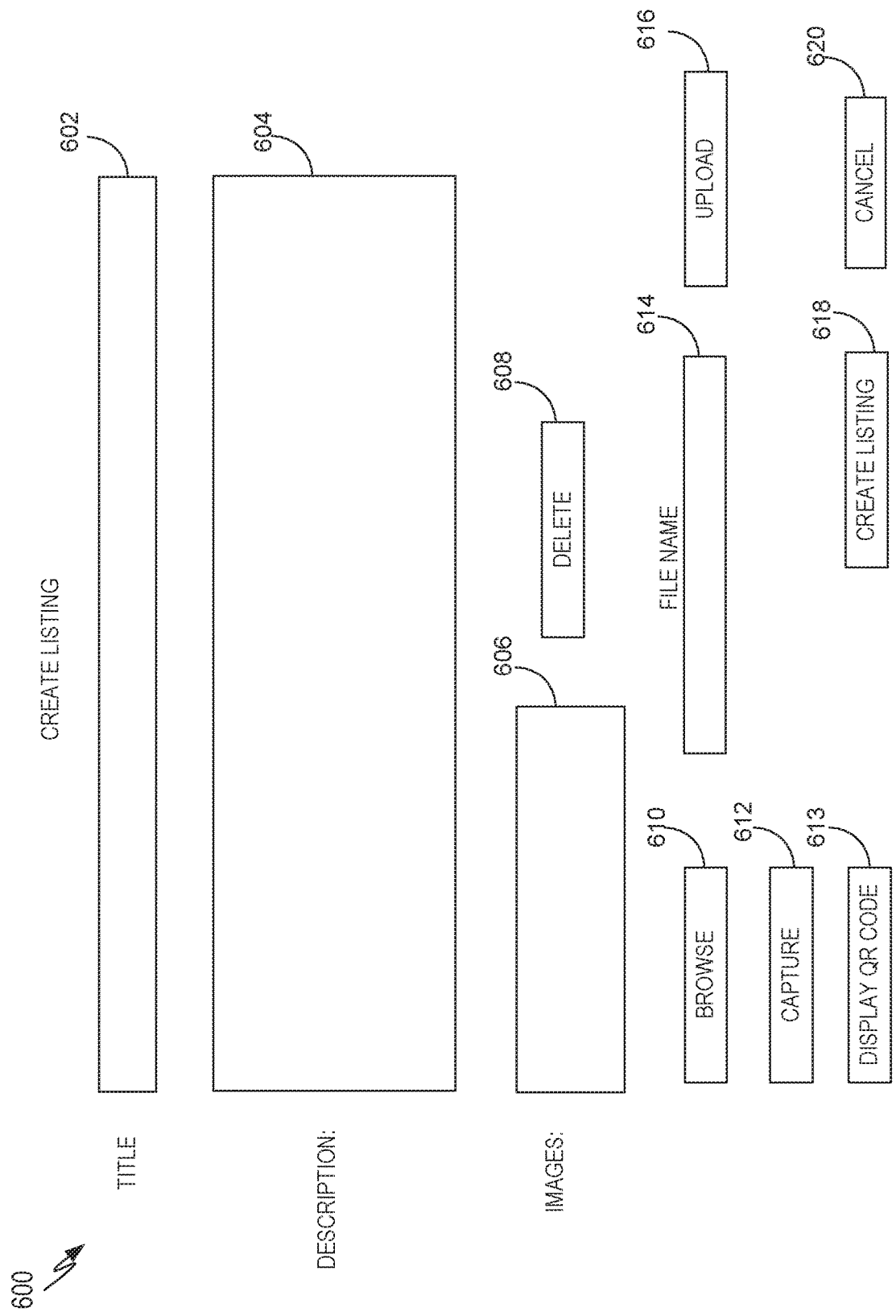
FIG. 6 shows an example user interface that may be implemented in one or more of the disclosed embodiments.

FIG. 6 shows an example user interface that may be implemented in one or more of the disclosed embodiments. The user interface 600 of FIG. 6 is displayed via a session. The session is established for an account, such as an account identified by the account table 400 discussed above. To establish the session, authentication credentials are provided for the account, such as an account name (e.g. field 403) and/or a password (e.g. stored in field 404). The session established to display the user interface 600 is for a user that intends to sell an item on the electronic marketplace. Input is received from the user indicating a request to display the user interface 600. The user interface 600 may be displayed by the seller application 202 discussed above with respect to FIG. 2. In some embodiments, the user interface 600 is a web based interface, and is displayed on a seller device (e.g. 104) but data defining the user interface 600 is provided by a back-end component, such as an application server as discussed further below.

The user interface 600 includes a title entry text box 602, description entry text box 604, images display region 606, and an image delete control 608. The title entry text box accepts input defining a title for a listing. The description entry text box 604 accepts input defining a description for the listing. The user interface 600 may store the input defining the description in the description field 426 in some embodiments. Images displayed or indicated in the image display region 606 may be deleted via the delete control 608. Images may be added to the image display region 606 by selecting them via a browse control 610, which displays a filename in the file name edit field 614. The image file may then be uploaded to the electronic marketplace 101 via an upload control 616. An image for the listing may also be captured via the capture control 612. In some embodiments, image capture includes capture of a QR code. A QR code is generated via the QR code control 613.

After image capture, the image is automatically uploaded to the electronic marketplace 101 and associated with the listing defined by the user interface 600. Capturing an image via the image capture control 612 may provide for a seller application (e.g. 202) to collect additional information for storage in metadata for the captured image. As discussed above, a location of a device displaying the user interface 600 when the image was captured may be stored in the image metadata. Similarly, a time/date of capture and/or a device identifier for a device displaying the user interface 600 may be stored in the image metadata. The device identifier uniquely identifies a particular device capturing the image when using the capture control 612.

Once data for the listing is populated via the user interface 600, the create listing control 618 is selected to store the listing data and activate the defined listing on the electronic marketplace 101. Activating the listing makes the listing available for viewing by other accounts on the electronic marketplace. For example, the listing may be displayed via the UI 500 after activation.

Figure 7:
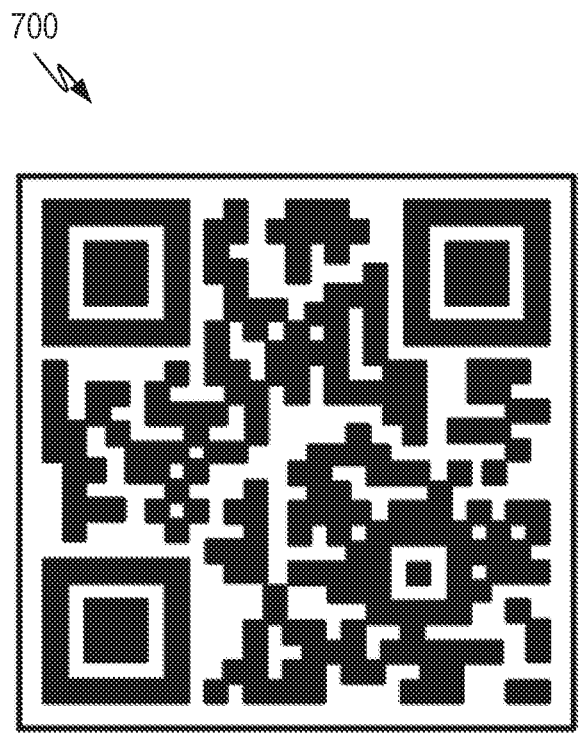
FIG. 7 is an example of a QR code that is displayed in some embodiments in response to a selection of the QR code control, discussed above with respect to FIG. 6.

FIG. 7 is an example of a QR code that is displayed in some embodiments in response to a selection of the QR code control 613, discussed above with respect to FIG. 6.

Figure 8:
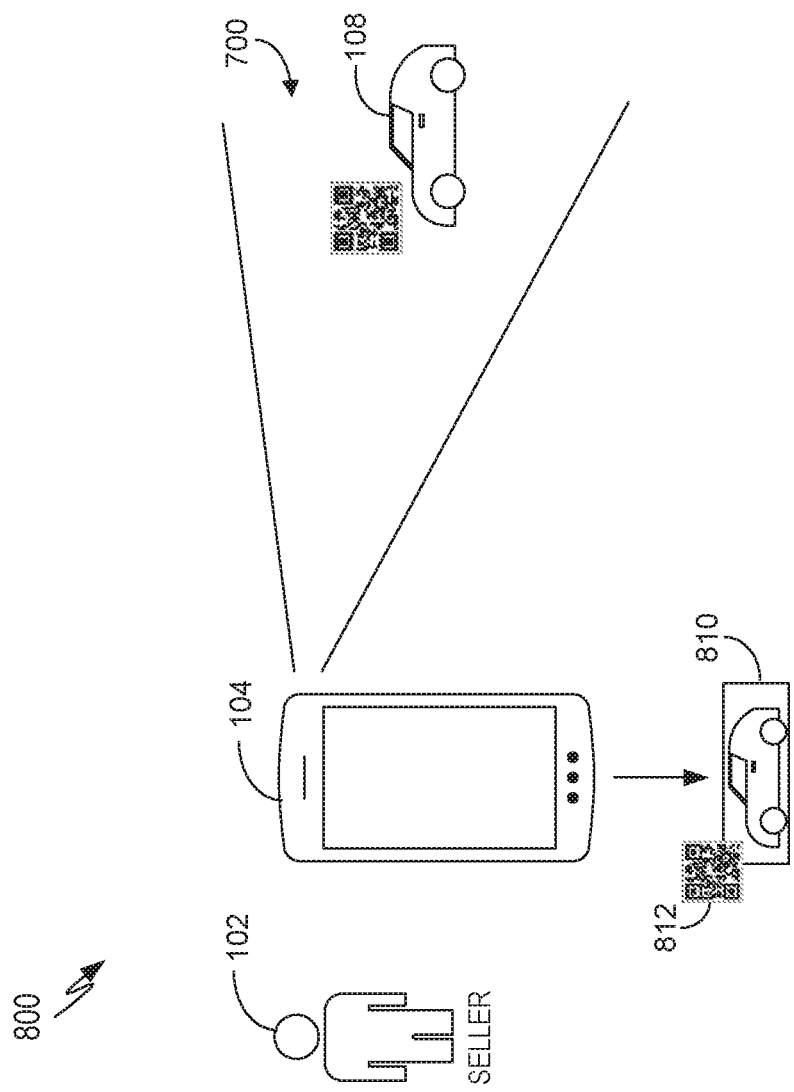
FIG. 8 shows an example of image capture of an item and a QR code.

FIG. 8 shows an example of image capture of an item and a QR code. FIG. 8 illustrates the seller 102 and seller device 104. The seller may select the QR code control 613 to display the QR code 700 of FIG. 7. The user may then print the displayed QR code. Once the QR code is available for imaging, the QR code is placed within a field of view of an imaging sensor of the seller device 104, as shown in FIG. 8, along with the item 108 which is a subject of a listing. The seller 102 then captures an image that includes both the item 108 and the QR code 700, shown in FIG. 8 as image 810. Embodiments of this disclosure then compare the Q/R code captured in the image 810 (e.g. labeled 812) with the QIR code generated via the selection of the control 61. If the two QR codes are equivalent, this provides an increased confidence that the seller is in possession of the item 108. The result of this comparison may be included when determining the image confidence indicator 512, discussed above with respect to FIG. 5.

Figure 9A:
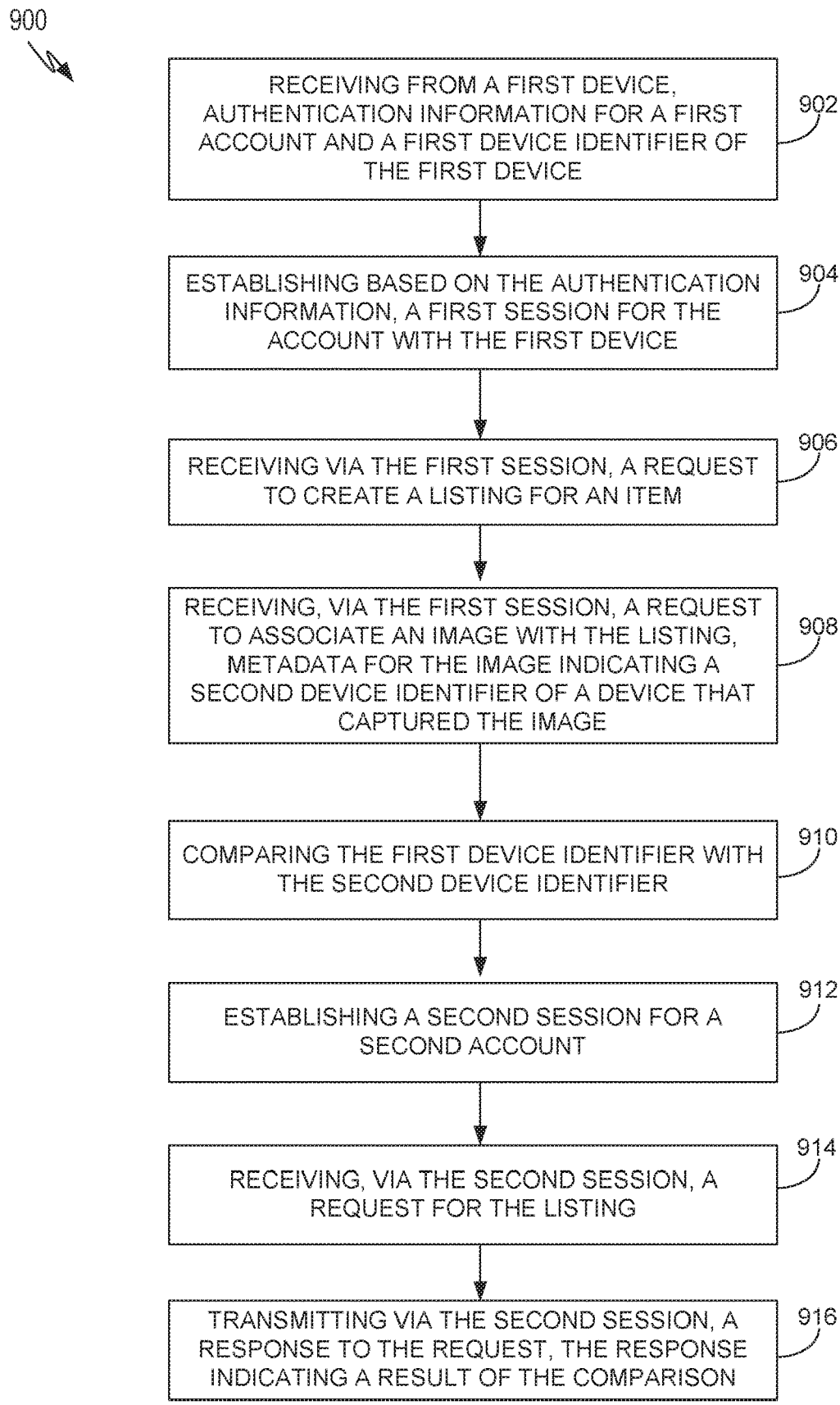
FIG. 9A is a flowchart of an example method that may be implemented in one or more of the disclosed embodiments.

FIG. 9A is a flowchart of an example method that may be implemented in one or more of the disclosed embodiments. One or more of the functions discussed below with respect to FIG. 9A and process 900 is performed, in at least some embodiments, by hardware processing circuitry. In some embodiments, one or more hardware memories store instructions that when executed by the hardware processing circuitry, configure the hardware processing circuitry to perform one or more of the functions discussed below with respect to FIG. 9A and process 900. In some embodiments, process 900 is performed by an application server of the electronic marketplace 101. In some embodiments, operations 904, 906, and 908 are performed by the seller application 202, which executes on a client deice, such as the seller device 104. In these embodiments, the seller application 202 then sends listing information to one or more back-end server(s), such as an application server for the electronic marketplace 101. The back-end server(s) then perform operations 910, 912, and 914.

In operation 902, authentication information for a first account is received. The authentication information is received from a first device. In some embodiments, the first device is a mobile device, such a smart phone. In some other embodiments, the first device is a laptop, tablet, or desktop computer. The first device may be associated with a user operating the first device. The user has an account with the electronic marketplace. Operation 902 may include reception of a network message from the first device, with the network message being an attempt to login or authenticate with the electronic marketplace. The authentication information may include an account name, account password, or other account authentication information, such as biometric information. Operation 902 also includes receiving a device identifier for the first device. The device identifier may uniquely identify the first device, for example, via a station address of the first device, mobile device identifier, or other identifying information for the first device. In some embodiments, a digital signature may be received in operation 902. The digital signature validates that the information received in operation 902 was generated by the first device.

In operation 904, a session is established with the first device. The session is established based on the authentication information received in operation 904.

In operation 906, a request to create a listing for an item is received. For example, a request to display the user interface 600 is received in operation 906 in some embodiments.

In operation 908, a request to associate an image with the listing is received. In some embodiments, the request of operation 908 may result from a user capturing an image for a listing via the capture control 612. In some embodiments, the request to associate the image of operation 908 may result from selection of the upload control 616 after population of the file name field 614.

If operation 908 includes capturing of an image via the capture control 612, operation 908 stores one or more of a capture date/time, capture geographic location, and device identification information in metadata for the captured image. The device identification information includes a second device identifier identifying a device upon which the capture operation is performed. The metadata may be stored in a file that also stores data representing the image (e.g. as described above with respect to FIG. 3) or it may be stored separately from the image data, such as in the data store 106.

As discussed above, in some embodiments, a QR code may be displayed by the disclosed embodiments. The QR code may be printed or otherwise made available for inclusion in an image representing the item.

In operation 908 does not include use of the capture control 612, but instead associates an image with the listing by receiving input indicating a predefined image file (e.g. via filename box 614 and upload control 616), operation 908 relies on the second device identifier being included in the uploaded image.

Operation 908 may include receiving input defining additional data for a listing, such as a listing title (e.g., via field 602), listing description (e.g. via 604), listing start date, listing end date, listing starting price, indications of whether the listing is for an auction or a classified ad, or other listing data that may vary by embodiment.

In operation 910, the first device identifier is compared to the second device identifier. Operation 910 determines at least whether the first device identifier is equivalent to the second device identifier. In some embodiments operation 910 further determines whether a capture location of the image is within a predetermined threshold distance of a location associated with the first account as a second factor. For example, operation 910 may second compare whether the capture location is within a threshold distance of an address associated with the account (e.g. via field 405). In some embodiments, operation 910 further determines whether a capture date/time of the image is within a predetermined elapsed time of a current time as a third factor. Alternatively the third factor represents an elapsed time between the capture time and a time when the request to create the listing in operation 906 was received. This determination is a third comparison that may be performed by operation 910. In some embodiments, operation 910 further analyzes the image to identify a QR code included in the image as a fourth factor. The identified QR-code is (fourth) compared to a second QR code displayed as part of one embodiment of operation 908, discussed above (e.g. via control 613). In some embodiments, the image is analyzed to detect image editing artifacts that may be present in manually edited images. The presence of image editing artifacts may be a fifth factor determined in operation 910. In embodiments that utilize the Q/R code comparison, the presence of image editing artifacts may negate any determination of a match between the first and second Q/R codes discussed above. Thus, if image editing artifacts are present, operation 910 operates as if no matching Q/R code was identified.

Operation 910 then generates a confidence index based on at least the first comparison, and zero or more of the second, third, and fourth comparisons discussed above. In some embodiments, results of each of the comparisons are weighted when determining the confidence index. For example, in some embodiments, each comparison may be of equal weight, with each comparison contributing 1/n of the confidence index's maximum value (e.g. 5 or 100) to the confidence index for the image, where N is the number of factors/comparisons considered in the confidence index determination. The confidence index is then determined by aggregating each factor's contribution. Other embodiments may utilize unequal weights for each factor/comparison when aggregating the factors.

In some embodiments, additional factors are considered when determining the confidence index. For example, some embodiments determine a form of the image. The image may be a snapshot, frame of a video, or a portion of a three dimensional model. An image form factor may be assigned different predetermined values based on the form of the image. The image form factor may then also be considered when determining the confidence index.

In operation 912, a second session is established for a second account. In a manner similar to that described above with respect to operation 902, authentication information for the second account is received in operation 912. The authentication information is received from a second device, such as buyer device 116 discussed above with resect to FIG. 1.

In operation 914, a request for the listing is received via the second session. For example, a user of the buyer device 116 may request to view the listing. In some embodiments, the buyer may have previously performed a search of the electronic marketplace 101 to identify the listing so that it can be requested in operation 914.

In operation 916, a response to the request of operation 914 is transmitted. The response indicates a result of the comparison of operation 910. For example, the response may indicate a result of the image confidence index determination described above with respect to operation 910. In some embodiments, the image confidence indicator is be displayed to resemble the confidence indicator 512, discussed above with respect to FIG. 5 and user interface 500.

Figure 9B:
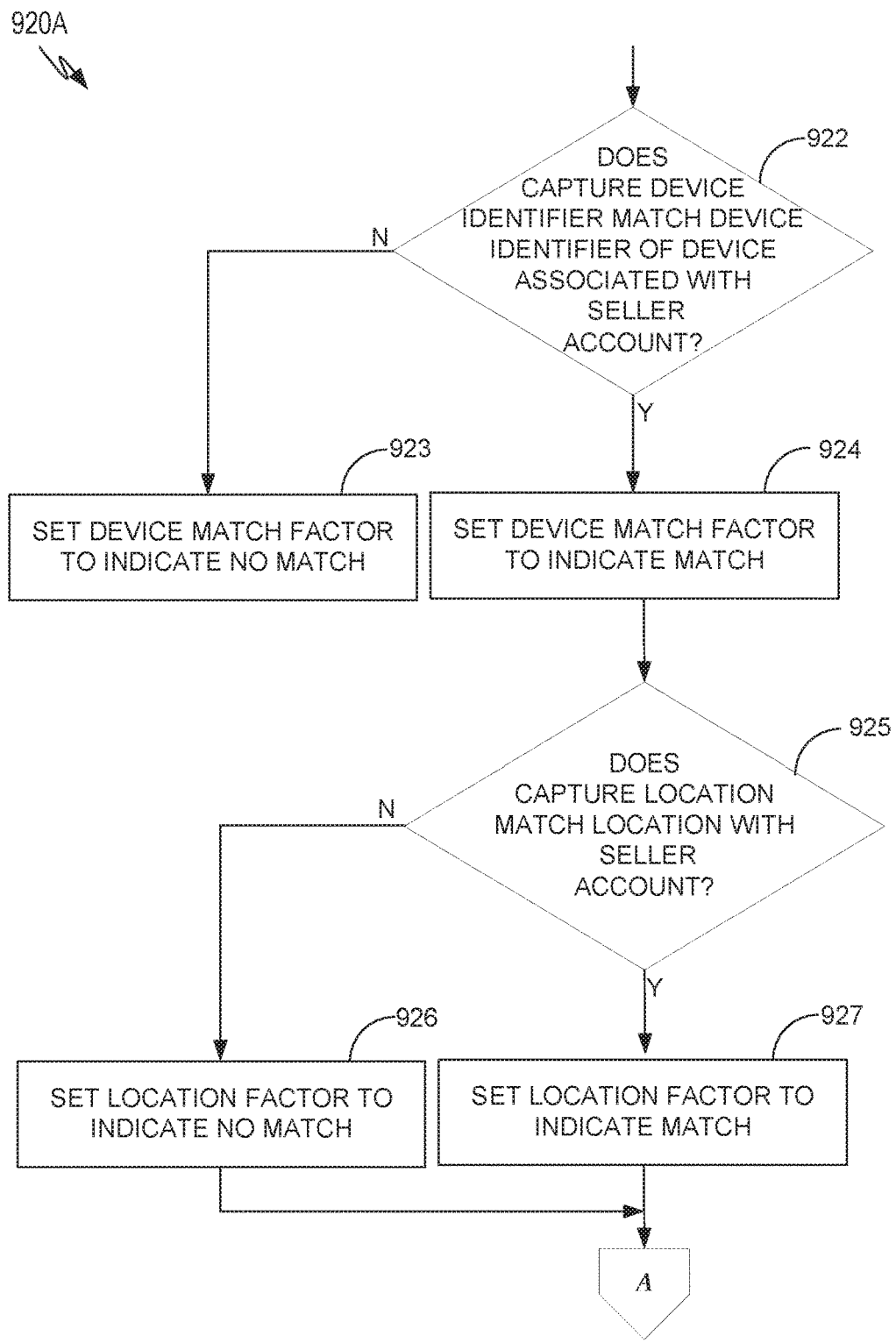
FIGS. 9B-D are a flowchart of an example method that may be implemented in one or more of the disclosed embodiments.
Figure 9C:
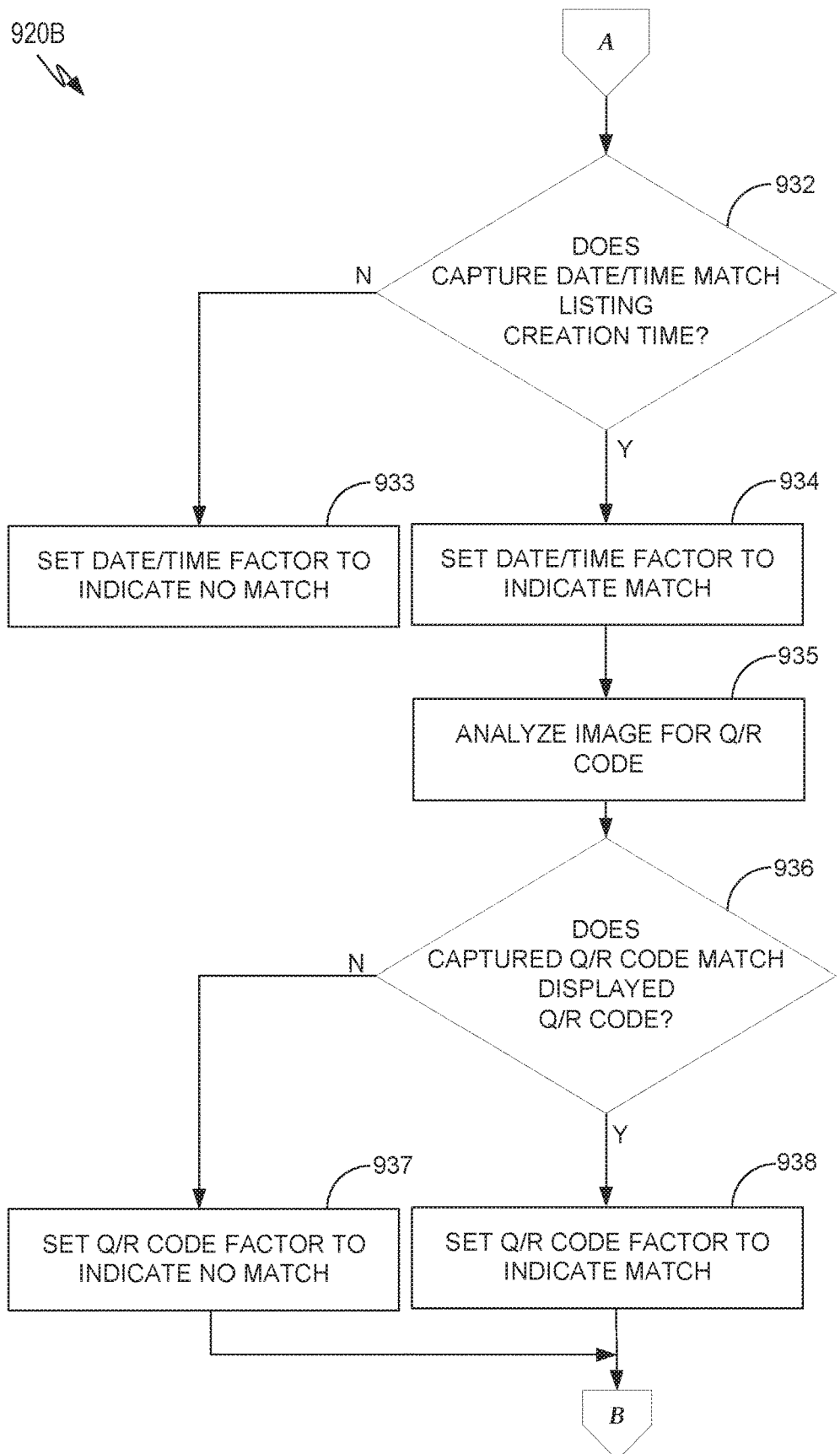
Figure 9D:
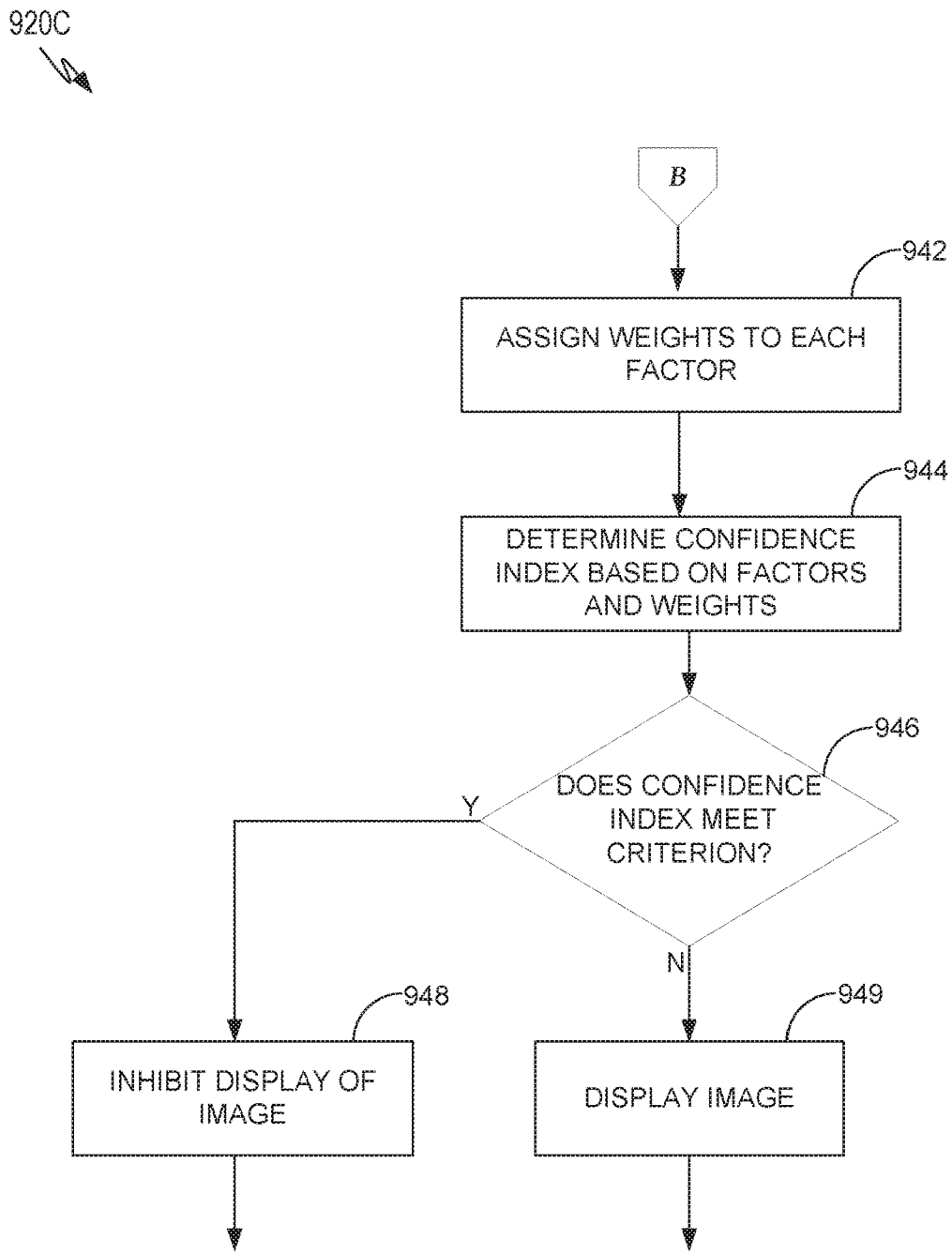

FIG. 9B-9D show a flowchart of a method for determining a confidence index that may be implemented in one or more of the disclosed embodiments. One or more of the functions discussed below with respect to FIGS. 9B-D and process 920 is performed, in at least some embodiments, by hardware processing circuitry. In some embodiments, one or more hardware memories store instructions that when executed by the hardware processing circuitry, configure the hardware processing circuitry to perform one or more of the functions discussed below with respect to FIGS. 9B-D and process 920. In some embodiments, process 920 is performed by an application server of the electronic marketplace 101. In some embodiments, process 920 is performed by the seller application 202, which executes on a client deice, such as the seller device 104. In these embodiments, the seller application 202 then sends listing information including the determined confidence index to one or more back-end server(s), such as an application server for the electronic marketplace 101. In some aspects, process 920 discussed below (portions labeled as 920*a-c* for FIGS. 9B-D respectively, is performed as part of operation 910, discussed above with respect to FIG. 9A.

Decision operation 922 evaluates whether a device identifier of a device that captured an image matches a device identifier for a device associated with a seller account. As described above, a device identifier of a device that captured an image may be obtained, in some embodiments, in metadata of the image. In some aspects, the device identifier is recorded by the device capturing the image, such as a seller device 104 running the seller application 202. Alternatively, $3^{rd}$ party image capture applications may also record capture device identifier information in image metadata. A device associated with the seller account may include a device that was used to initially establish the seller account. Alternatively, an association between a device and the seller account could be established in other ways. For example, if a device is used to successfully authenticate with the seller account, this may form an association between the device and the seller account (e.g. some embodiments may store this association in the account device table 410, discussed above with respect to FIG. 4. Some embodiments may maintain an association between a seller account and a device only when the device has a currently active session established with the seller account, or when the device was used to establish a session with the account within a predetermined elapsed time period (e.g. within the last week, month, year, etc).

If the capture device identifier matches the second device identifier of a device associated with the seller account, process 920 moves from decision operation 922 to operation 924, which sets a device match factor to indicate the match. For example, operation 924 sets the device match factor to a first value in some embodiments. If the two device identifiers do not match, process 920 moves from decision operation 922 to operation 923, which sets the device match factor to indicate the lack of a match. In some embodiments, operation 923 sets the device match factor to a second value different from the first value applied in operation 924.

Process 920 then moves to decision operation 925, which evaluates whether a capture location of the image matches a location associated with the seller account. In some embodiments, the capture location is obtained from metadata of the image (e.g. metadata field 314). In some other embodiments, the capture location is obtained from data separate from the image itself such as via image table 430 (e.g. field 446). The location associated with the seller account may be a location specified when the account was established, such as a shipping address or other address associated with the account (e.g. field 405). In some aspects, the location associated with the seller account is a location associated with an area code included in a phone number associated with the account (e.g. area code of phone number stored in field 406). In some aspects, the location associated with the account may be a centroid location from multiple locations used to access an account. In these embodiments, each time a seller accesses their account, a location of the access is obtained by the electronic marketplace 101. A centroid of these access locations is then determined, with outliers discarded to avoid disruption of the centroid calculation.

Whether the two locations match may be based on whether the two locations are within a predetermined distance of each other. The predetermined distance may vary by embodiment, but could be any of several meters to one or more kilometers or miles.

If the locations do not match (are not within the predetermined distance of each other) process 920 moves from decision operation 925 to operation 926, which set a location factor to a third value that indicates the locations do not match. If the locations do match, process 920 moves from decision operation 925 to operation 927, which sets the location factor to a fourth value that indicates the locations match.

Process 920 then moves through off-page reference "A" to decision operation 932 of FIG. 9C. Decision operation 932 evaluates whether a capture date and/or time is within a threshold elapsed time of either a time that a listing including the image was created or a present/current time. The predetermined elapsed time may vary by embodiment, but example values could include a number of minutes, hours, days, weeks, or months. If the date/time is not within the threshold elapsed time, process 920 moves from decision operation 932 to operation 933, which sets a date/time factor to a fifth value which indicates the date/time does not match. If the capture date/time does match, process 920 moves from decision operation 932 to operation 934, which sets the date/time factor to a sixth value to indicate the date/time matches. Process 920 then moves to operation 935, which analyzes the image for a Q/R code. Process 920 then moves to decision operation 936, which determines whether a QR code identified in the image (assuming a Q/R code was identified) matches a Q/R code previously displayed. For example, a Q/R code identified in the image is compared to a Q/R code displayed as a result of a selection of control 613 discussed above with respect to FIG. 6 in some embodiments. If the Q/R codes do not match, or if no Q/R code is found in the image, process 920 moves from decision operation 936 to operation 937, which sets a Q/R code factor to indicate no Q/R code match was found. If the Q/R code does match, process 920 moves from decision operation 936 to operation 938, which sets the Q/R code factor to indicate the Q/R codes do match.

Process 920 then moves through off-page reference "B" to operation 942, which assigns weights to each of the factors discussed above with respect to FIGS. 9B and 9C. In some aspects, the weights are equal. In some aspects, some of the weights are equal. In some aspects, none of the weights are equal.

In operation 944, a confidence index is determined based on the factors and the weights. In some aspects, the confidence index is determined by adding each factor discounted by the factors respective weight. In some aspects, the factors are averaged after discounting by their respective weights.

Decision operation 946 determines whether the confidence index meets one or more criterion (e.g. identifying an image below a confidence threshold). If the confidence index meets the one or more criterion, then process 920 moves from decision operation 946 to operation 948, which inhibits display of the image. For example, in some embodiments, if confidence that the image is valid is so low, it may not be displayed by the disclosed embodiments. In some embodiments, operation 948 may display a notification message to the user, indicating the message will not be displayed to prospective buyers in a listing. In some aspects, no reason for the inhibiting of the display of the image may be given in the displayed notification. This avoids providing fraudulent sellers with information that might be used to subvert the verification of capture location as described herein. In some other aspects, the notification message may indicate that the image was inhibited by a security filter. As described below with respect to FIG. 9E, if a seller attempts to upload a predetermined number of images that indicate capture locations that are inconsistent with the seller's location, or, as described below, consistent with locations known to be a source of fraudulent activity, the seller's account may be deactivated. Alternatively, a listing associated with the uploading/capturing activity may be removed from the electronic marketplace 101. In some aspects, a threshold percentage of uploaded/captured images is used to take remedial action with respect to a listing and/or seller. For example, a seller that uploads thousands of images and has only five images that do not meet capture location criterion as described above may face no action. A smaller seller who uploads five images, each of which include a capture location inconsistent with the seller's location may face remedial action such as having their account disabled or listing removed from the electronic marketplace 101.

If the confidence index does not meet the one or more criterion, process 920 moves from decision operation 946 to operation 949, which provides for display of the image. For example, the image may be displayed as part of a listing display, such as image 504 in the example listing displayed in user interface 500 of FIG. 5. The confidence index determined by process 920 and discussed above may be used to determine the image confidence indicator 512, also displayed with respect to user interface 500 and FIG. 5.

Figure 9E:
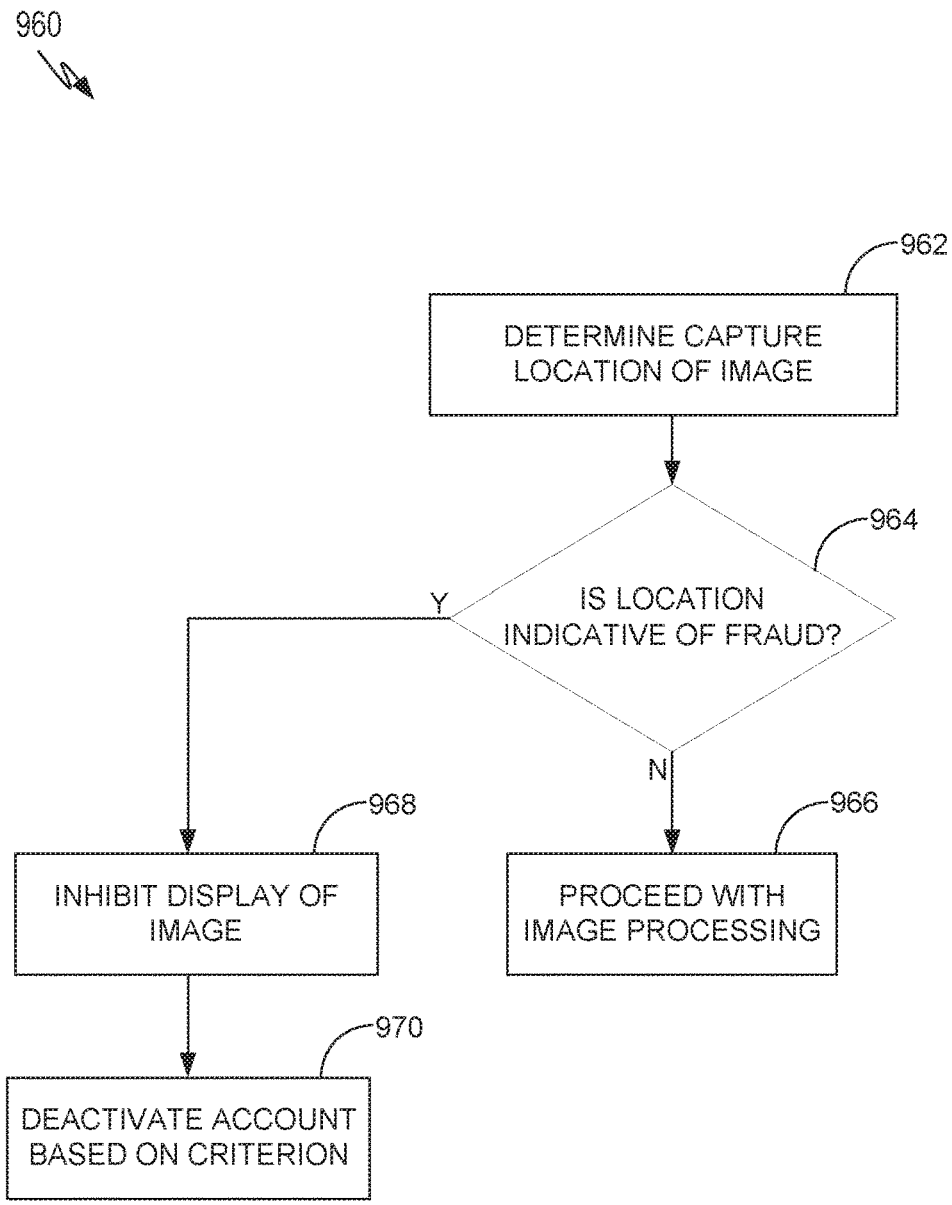
FIG. 9E is a flowchart of an example method for evaluating capture device information that may be implemented in one or more of the disclosed embodiments.

FIG. 9E shows a flowchart of a method for evaluating capture device information that may be implemented in one or more of the disclosed embodiments. One or more of the functions discussed below with respect to FIG. 9E and process 960 is performed, in at least some embodiments, by hardware processing circuitry. In some embodiments, one or more hardware memories store instructions that when executed by the hardware processing circuitry, configure the hardware processing circuitry to perform one or more of the functions discussed below with respect to FIG. 9E and process 960. In some embodiments, process 960 is performed by an application server of the electronic marketplace 101. In some embodiments, process 960 is performed by the seller application 202, which executes on a client device, such as the seller device 104.

In some embodiments, process 960 operates as part of operation 944, discussed above. For example, in some aspects, process 960 is included as part of processing of an image based on a capture location of the image. As described above, the capture location may be compared to a location associated with an account that is attempting to upload or otherwise associate the image with a listing on the electronic marketplace. The capture location may further, as described above, be compared to location information indicative of fraudulent activity. Process 960 operates within the domain of, or with respect to, operations initiated by a particular account (e.g. identified via field 402 in some embodiments). For example, the client application 202 may initiate an image capture for an image described below with respect to process 960. The client application 202 is logged into the electronic marketplace 101 via an account (e.g account credentials matching those stored in field 404 are entered into a login dialog provided by the client application 202 in at least some aspects).

In operation 962, a capture location of an image is determined. In some embodiments, operation 962 may be included in or equivalent to operation 925, discussed above. The capture location may be obtained from metadata (e.g. 314). In some embodiments, the capture location is obtained by the client application 202. For example, in these embodiments, the client application 202 initiates an image capture operation via the API 206 and/or the sensor controller 210. The client application then obtains location information from an on-board GPS receiver (e.g. 212).

Decision operation 964 determines whether the location is indicative of fraud. For example, some embodiments maintain a location data store (e.g. 460) that tracks various locations and their propensity for fraudulent activity. In some aspects, the locations tracked may be encompass relatively large land areas, such as counties, states, provinces, or whole countries. In some aspects, the locations tracked may encompass smaller regions. For example, individual street address locations may be tracked in some embodiments. The size of the region for each location may be indicated, in some embodiments, via the location table 460 (e.g. via field 468). Decision operation 964 may determine whether a particular location is indicative of fraud by first comparing the capture location to each region defined by the location data store (e.g. via combination of location field 464 and radius field 468). While the example location data store 460 illustrates the radius field 468, other embodiments may provide for more sophisticated definitions of a region, such as by storing multiple vectors for each location field 464 that define boundaries of a region. Decision operation then determines if the capture location is within the boundaries of the region. If the location is within a region, some of the disclosed embodiments then consult other information (e.g. field 466) to determine whether the region is indicative of fraud (some embodiments may only determine regions for locations indicative of fraud).

If the location is not indicative of fraud (i.e. the capture location does not fall within any region specified by the location data store (e.g. 460) or if it does fall within the region, the region is not currently indicated to be indicative of fraud (e.g. via field 466). Process 960 moves from decision operation 964 to 96, which continues processing of the image. In other words, if process 960 is integrated into process 920 discussed above, operation 966, is included in operation 949. If decision operation 964 determines the location is indicative of fraud, process 960 moves from operation 964 to operation 968. In some embodiments, operation 968 is equivalent to operation 948, discussed above. Process 960 then moves to operation 970.

In operation 970, an account is considered for deactivation. The account considered for deactivation is the account under which process 960 is operating. As described above, the image discussed above is being processed via input from an account. In some aspects, the client application 202 is logged into an account on the electronic marketplace 101 and is attempting to associate the image with a listing. The account may initiate an image upload operation (e.g. via 616) and/or initiates an image capture operation (e.g. via control 612). Based on at least one of these inputs, process 960 executes to process the image.

Deactivation of an account may be determined, at least in some embodiments, based on a propensity for the account to attempt to process images linked to a fraudulent location. For example, some of the disclosed embodiments may count a number of times images linked to a fraudulent location are uploaded by the account (this may be stored in the fraudulent activity indicator field 409 in some embodiments). Alternatively, in some embodiments, a location of the client application 202 when an image is captured may be recorded (e.g. capture location). A number of times a capture location is linked to a fraudulent location may alternatively be counted in some embodiments (e.g. and stored in the fraudulent activity indicator field 409). If these counts meet one or more criterion, the account is deactivated in some embodiments. The deactivation prevents further activity on the account. Thus, no additional logins to the account may be performed successfully. Furthermore, in some embodiments, deactivation causes any current sessions using the account to be terminated.

Figure 10:
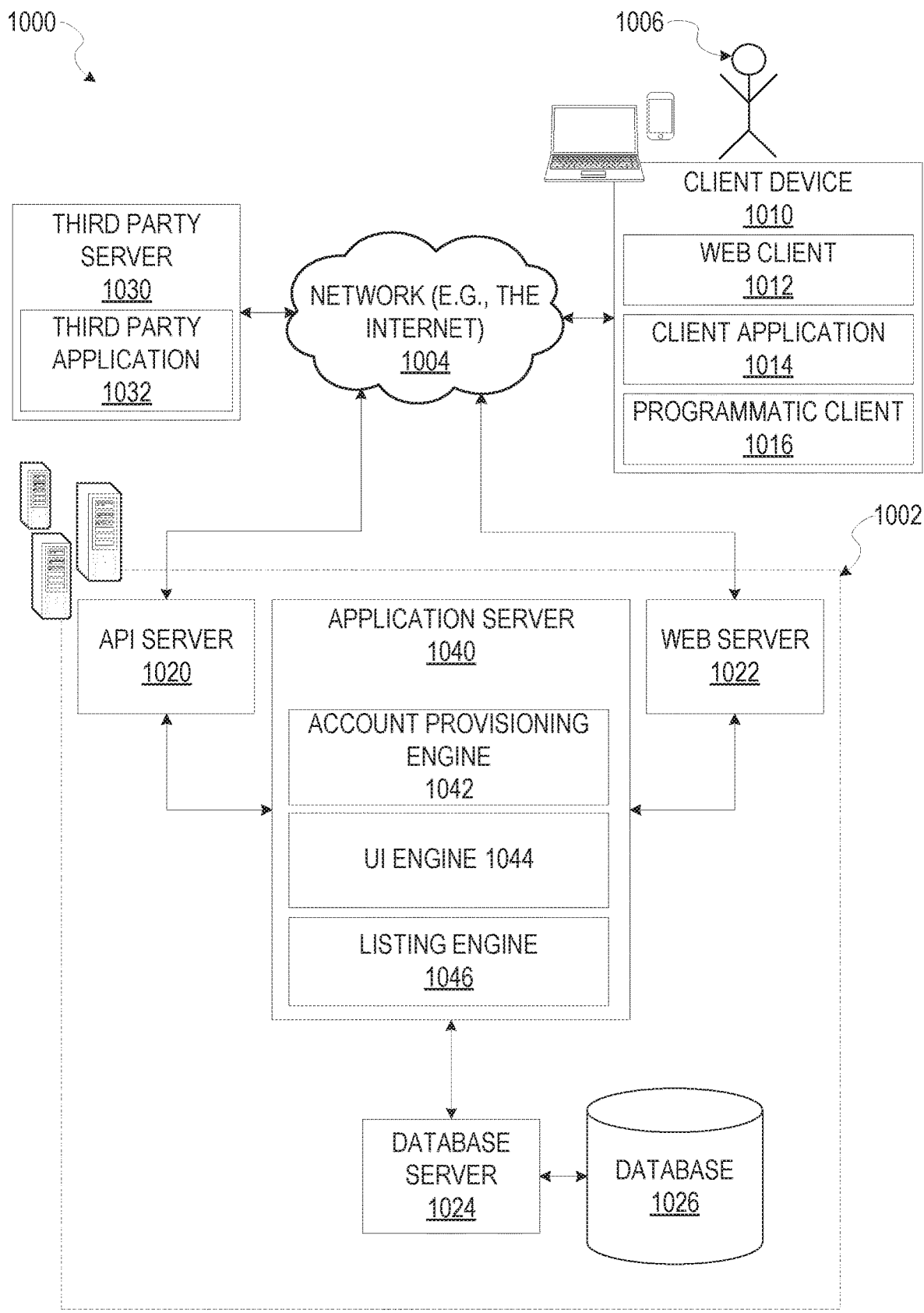
FIG. 10 illustrates, for example, a web client (e.g., a browser), a client application and a programmatic client 1016 executing on the client device 1010.

FIG. 10 illustrates, for example, a web client 1012 (e.g., a browser), a client application 1014, and a programmatic client 1016 executing on the client device 1010. The client device 1010 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the content publication platform 1002. In some embodiments, the client device 1010 comprises a display module (not shown) to display information (e.g., in the form of user interfaces). In further embodiments, the client device 1010 comprises one or more of a touch screens, accelerometers, gyroscopes, cameras, microphones, global positioning system (GPS) devices, and so forth. In one embodiment, the content publication platform 1002 is a network-based marketplace that publishes publications (e.g., web documents) comprising item listings of products available on the network-based marketplace.

One or more users 1006 may be a person, a machine, or other means of interacting with client device 1010. In example embodiments, the user 1006 is not part of the client-server-based architecture 1000, but interacts with the client-server-based architecture 1000 via the client device 1010 or another means. For example, the user 1006 may provide input (e.g., touch screen input or alphanumeric input) to the client device 1010, and the input is communicated to the content publication platform 1002 via a network 1004. In this instance, the content publication platform 1002, in response to receiving the input from the user 1006, communicates information (e.g., user interfaces) to the client device 1010 via the network 1004 to be presented to the user 1006. In this way, the user 1006 can interact with the content publication platform 1002 using the client device 1010.

The client device 1010 may include one or more client applications 1014 (also referred to as "apps") such as, but not limited to, a web browser, messaging application, electronic mail (email) application, an e-commerce site application (also referred to as a marketplace application), and the like. In some embodiments, if the e-commerce site application is included in the client device 1010, then this application is configured to locally provide the user interface and at least some of the functionalities with the client application 1014 configured to communicate with the content publication platform 1002, on an as needed basis, for data or processing capabilities not locally available (e.g., access to a database of items available for sale, to authenticate the user 1006, to verify a method of payment). Conversely if the e-commerce site application is not included in the client device 1010, the client device 1010 may use its web browser to access the e-commerce site (or a variant thereof) hosted on the content publication platform 102.

One or more portions of network 1004 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

An application program interface (API) server 1020 and a web server 1022 are coupled to, and provide programmatic and web interfaces respectively to an application server 1040. The application server 1040 hosts an account provisioning engine 1042, UI engine 1044, and listing engine 1044, which may be embodied as hardware, software, firmware, or any combination thereof. The account provisioning engine 1042 functions to establish accounts for buyers and sellers of the electronic marketplace 101. For example, the account provisioning engine 1042 may populate and/or manage the account table 400 discussed above with respect to FIG. 4. The account provisioning engine 1042 may receive device identification information from a device initiating a creation of the account. The device identification information may be stored in an account device table, such as the account device table 410 discussed above with respect to FIG. 4. The device identification information received during account creation may then be compared, in some embodiments, to capture device identification information associated with an image to be included in a listing, as also discussed above.

The UI engine 1044 is configured to display user interfaces for listing creation (e.g. 600) and/or listing display (e.g. 500). The UI engine 1044 displays a confidence indicator generated according to the disclosed embodiments. The listing engine 1046 functions to create and display listings of items for sale. For example, the listing engine 1046 stores data obtained via the user interface 600 (or similar) in some embodiments, and displays the listing data to a potential buyer via interface 500 (or similar) when requested.

The application server 1040 is, in turn, shown coupled to a database server 1024 that facilitate access to database 1026. In an example embodiment, the database 1026 is a storage device that stores information such as any of the data structures discussed above with respect to FIG. 4 and/or data store 106. The databases 1026 may also store digital item information in accordance with example embodiments.

Additionally, a third party application 1032, executing on a third party server 1030, is shown as having programmatic access to the content publication platform 1002 via the programmatic interface provided by the API server 1020. For example, the third party application 1032, utilizing information retrieved from the content publication platform 1002, supports one or more features or functions on a website hosted by the third party.

Figure 11:
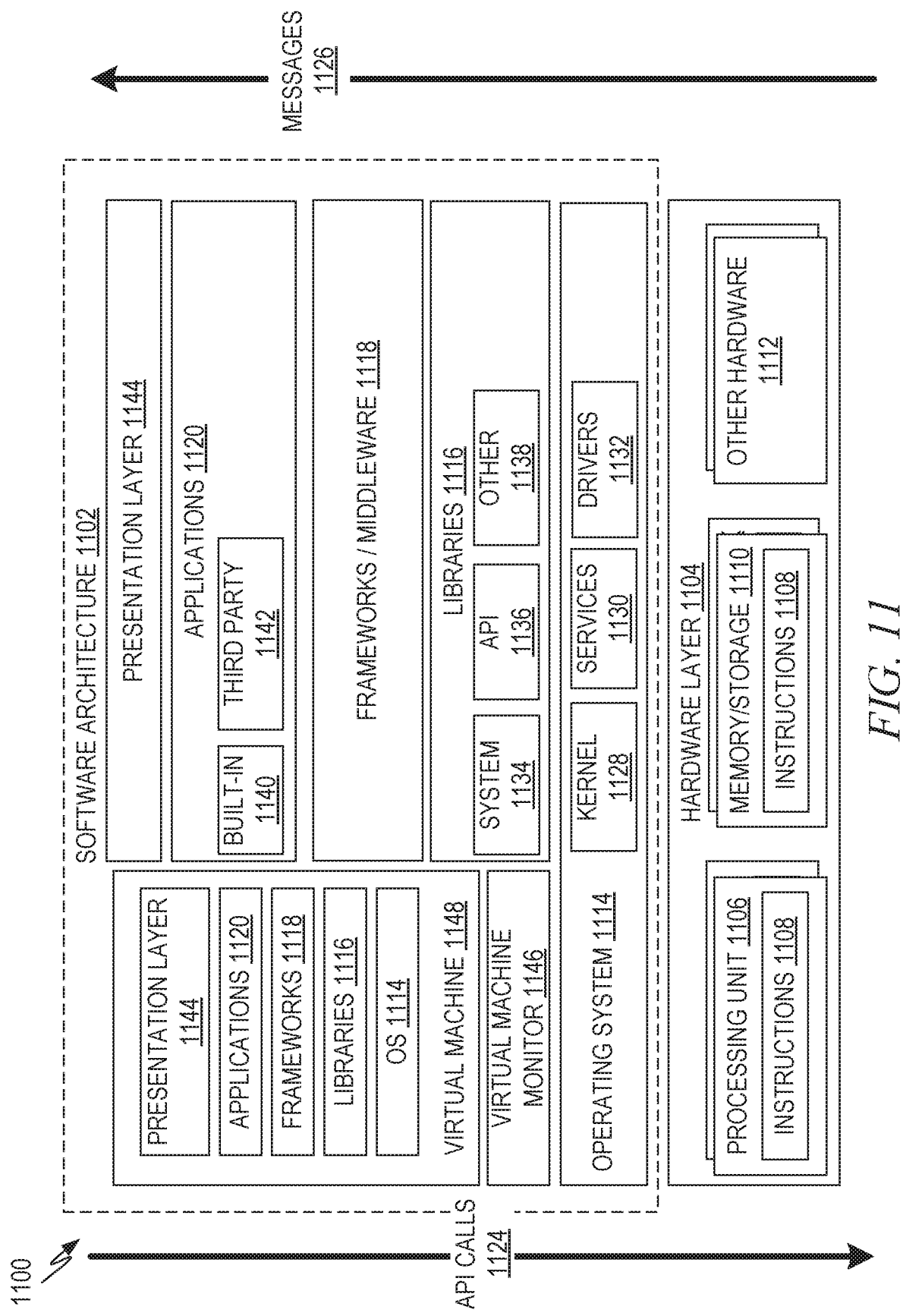
FIG. 11 is a block diagram illustrating a representative software architecture which may be used in conjunction with various hardware architectures herein described.

FIG. 11 is a block diagram 1100 illustrating a representative software architecture 1102, which may be used in conjunction with various hardware architectures herein described. FIG. 11 is merely a non-limiting example of a software architecture and it will be appreciated that many other architectures may be implemented to facilitate the functionality described herein. The software architecture 1102 may be executing on hardware such as machine 1200 of FIG. 12 that includes, among other things, processors 1410, memory 1430, and I/O components 1450. A representative hardware layer 1104 is illustrated and can represent, for example, the machine 1200 of FIG. 12. The representative hardware layer 1104 comprises one or more processing units 1106 having associated executable instructions 1108. Executable instructions 1108 represent the executable instructions of the software architecture 1102, including implementation of the methodologies and modules and so forth described above. Hardware layer 1104 also includes memory and/or storage modules 1110, which also have executable instructions 1108. Hardware layer 1104 may also comprise other hardware as indicated by 1112 which represents any other hardware of the hardware layer 1104, such as the other hardware illustrated as part of machine 1400, discussed below.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120 and presentation layer 1144. Operationally, the applications 1120 and/or other components within the layers may invoke application programming interface (API) calls 1124 through the software stack and receive a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130, and/or drivers 1132). The libraries 1116 may include system 1134 libraries (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPREG4, H.264. MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks/middleware 1118 (also sometimes referred to as "middleware) may provide a higher-level common infrastructure that may be utilized by the applications 1120 and/or other software components/modules. For example, the frameworks 1118 may provide various graphic user interface (GUI) functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 includes built-in applications 1140 and/or third party applications 1142. Examples of representative built-in applications 1140 may include, but are not limited to, a contacts application, a browser application, a book reader application, a location application, a media application, a messaging application, and/or a game application. Third party applications 1142 may include any of the built in applications as well as a broad assortment of other applications. In a specific example, the third party application 1142 (e.g., an application developed using the Android™ or iOS™ software development kit (SDK) by an entity other than the vendor of the particular platform) may be mobile software running on a 'mobile operating system such as iOS™, Android™, Windows® Phone, or other mobile operating systems. In this example, the third party application 1142 may invoke the API calls 1136 provided by the mobile operating system such as operating system 1114 to facilitate functionality described herein.

The applications 1120 may utilize built in operating system functions (e.g., kernel 1128, services 1130 and/or drivers 1132), libraries (e.g., system 1134, APIs 1136, and other libraries 1138), frameworks/middleware 1118 to create user interfaces to interact with users of the system. Alternatively, or additionally, in some systems interactions with a user may occur through a presentation layer, such as presentation layer 1144. In these systems, the application/module "logic" can be separated from the embodiments of the application/module that interact with a user.

Some software architectures utilize virtual machines. In the example of FIG. 11, this is illustrated by virtual machine 1148. A virtual machine creates a software environment where applications/modules can execute as if they were executing on a hardware machine (such as the machine 1200 of FIG. 12, for example). A virtual machine is hosted by a host operating system (operating system 1114 in FIG. 11) and typically, although not always, has a virtual machine monitor 1146, which manages the operation of the virtual machine as well as the interface with the host operating system (i.e., operating system 1114). A software architecture executes within the virtual machine such as an operating system 1114, libraries 1116, frameworks/middleware 1118, applications 1120 and/or presentation layer 1144. These layers of software architecture executing within the virtual machine 1148 can be the same as corresponding layers previously described or may be different.

Figure 12:
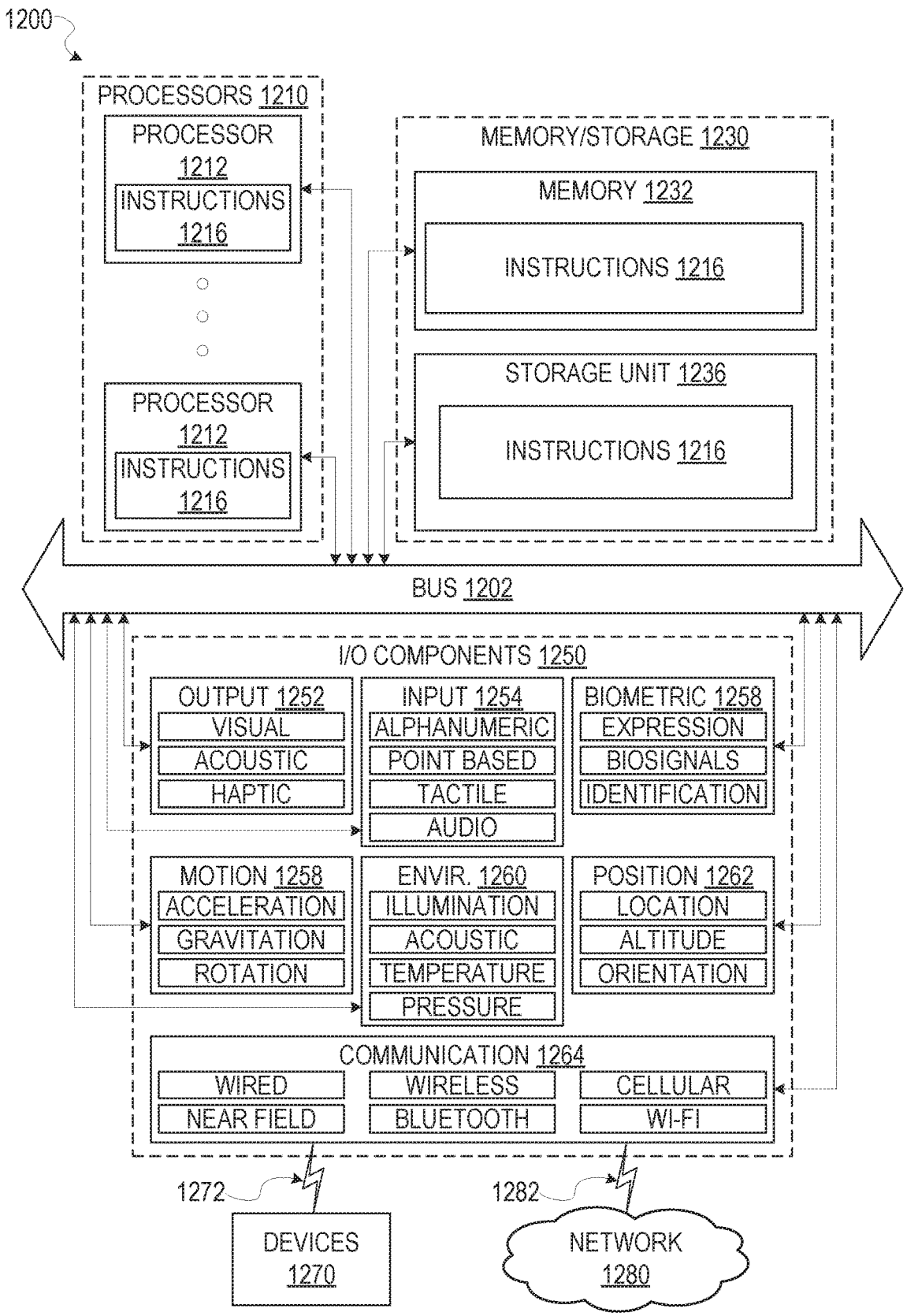
FIG. 12 is a block diagram illustrating components of the machine according to some example embodiments, able to read instructions from a machine-readable medium (e.g., a machine-readable storage device) and perform any one or more of the methodologies discussed herein.

FIG. 12 is a block diagram illustrating components of the machine 1200, according to some example embodiments, able to read instructions from a machine-readable medium (e.g., a machine-readable storage device) and perform any one or more of the methodologies discussed herein. Specifically. FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. These instructions transform the general, non-programmed machine into a particular machine programmed to carry out the described and illustrated methodologies in the manner described herein. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. By way of non-limiting example, the machine 1200 may comprise or correspond to a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory/storage 1230, and I/O components 1250, which may be configured to communicate with each other such as via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 1212 and a processor 1214 that may execute the instructions 1216. The term "processor" is intended to include a multi-core processor 1210 that may comprise two or more independent processors (sometimes referred to as "cores") that may execute instructions contemporaneously. Although FIG. 12 shows multiple processors, the machine 1200 may include a single processor with a single core, a single processor with multiple cores (e.g., a multi-core processor), multiple processors with a single core, multiple processors with multiples cores, or any combination thereof.

The memory/storage 1230 may include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 may also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of the processors 1210 are examples of machine-readable media.

As used herein, "machine-readable medium" means a device able to store instructions and data temporarily or permanently, and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine (e.g., processors 1210), cause the machine to perform any one or more of the methodologies described herein. Accordingly, a "machine-readable medium" refers to a single storage apparatus or device, as well as "cloud-based" storage systems or storage networks that include multiple storage apparatus or devices.

Executable Instructions and Machine-Storage Medium

The various memories (i.e., 1230, 1232, and/or memory of the processor(s) 1210) and/or storage unit 1236 may store one or more sets of instructions and data structures (e.g., software) embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, transitory signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal"

means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion, and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262, among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), acoustic sensor components (e.g., one or more microphones that detect background noise), or other components that may provide indications, measurements, or signals corresponding to a surrounding physical environment. The position components 1262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272 respectively. For example, the communication components 1264 may include a network interface component or other suitable device to interface with the network 1280. In further examples, the communication components 1264 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a Universal Serial Bus (USB)).

Moreover, the communication components 1264 may detect identifiers or include components operable to detect identifiers. For example, the communication components 1264 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

In various example embodiments, one or more portions of the network 1280 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

Example 1 is a method performed by hardware processing circuitry, comprising: receiving, from a device, authentication information for an account and a first device identifier of the device; establishing, based on the authentication information, a first session for the account with the device; receiving, via the first session, a request to create a listing for an item; receiving, via the first session, a request to associate an image with the listing, metadata for the image indicating a second device identifier of a device that captured the image; comparing the first device identifier with the second device identifier; establishing a second session for a second account; receiving, via the second session, a request for the listing; transmitting, via the second session, a response to the request, the response indicating a result of the comparison.

In Example 2, the subject matter of Example 1 optionally includes wherein the metadata further indicates a time of image capture, the method further comprising performing a second comparison of the time of image capture and a present time, and wherein the response further indicates a result of the second comparison.

In Example 3, the subject matter of Example 2 optionally includes wherein the metadata further indicates a location of image capture, and Example 2 comprises performing a third comparison of the location of image capture and an address associated with the account, wherein the response further indicates a result of the third comparison.

In Example 4, the subject matter of Example 3 optionally includes determining a confidence value based on the first, second, and third comparisons, wherein the response further indicates the confidence value.

In Example 5, the subject matter of Example 4 optionally includes associating a first, second, and third weight with the first, second, and third comparisons respectively, wherein the determination of the confidence value is further based on the weights.

In Example 6, the subject matter of any one or more of Examples 4-5 optionally include determining whether the image is a snapshot, a frame in a video, or a portion of a three-dimensional model, wherein the determination of the confidence value is further based on the determining.

In Example 7, the subject matter of any one or more of Examples 4-6 optionally include determining a file type of the image, wherein the determination of the confidence value is further based on the file type.

In Example 8, the subject matter of any one or more of Examples 4-7 optionally include determining a reputation of the account, wherein the determination of the confidence value is further based on the reputation.

In Example 9, the subject matter of any one or more of Examples 1-8 optionally include stripping the metadata from the image, wherein the response further indicates the stripped image.

In Example 10, the subject matter of any one or more of Examples 1-9 optionally include hashing the metadata, wherein the response further indicates the hashed metadata.

In Example 11, the subject matter of any one or more of Examples 1-10 optionally include wherein the metadata includes a digital signature, the method further comprising validating the second device identifier based on the digital signature.

In Example 12, the subject matter of any one or more of Examples 1-11 optionally include generating a first QR code, causing display, via the first session, of the QR code; analyzing the image to identify a second QR code; comparing the first QR code to the second QR code, wherein the response is generated to further indicate a result of the QR code comparison.

Example 13 is a system, comprising: hardware processing circuitry; one or more hardware memories storing instructions that when executed configure the hardware processing circuitry to perform operations comprising: receiving, from a device, authentication information for an account and a first device identifier of the device; establishing, based on the authentication information, a first session for the account with the device; receiving, via the first session, a request to create a listing for an item; receiving, via the first session, a request to associate an image with the listing, metadata for the image indicating a second device identifier of a device that captured the image; comparing the first device identifier with the second device identifier; establishing a second session for a second account; receiving, via the second session, a request for the listing; and transmitting, via the second session, a response to the request, the response indicating a result of the comparison.

In Example 14, the subject matter of Example 13 optionally includes wherein the metadata further indicates a time of image capture, the operations further comprising performing a second comparison of the time of image capture and a present time, and wherein the response further indicates a result of the second comparison.

In Example 15, the subject matter of Example 14 optionally includes wherein the metadata further indicates a location of image capture, the operations further comprising performing a third comparison of the location of image capture and an address associated with the account, wherein the response further indicates a result of the third comparison.

In Example 16, the subject matter of any one or more of Examples 13-15 optionally include the operations further comprising determining a confidence value based on the first, second, and third comparisons, wherein the response further indicates the confidence value.

In Example 17, the subject matter of Example 16 optionally includes the operations further comprising associating a first, second, and third weight with the first, second, and third comparisons respectively, wherein the determination of the confidence value is further based on the weights.

In Example 18, the subject matter of any one or more of Examples 16-17 optionally include the operations further comprising determining whether the image is a snapshot, a frame in a video, or a portion of a three-dimensional model, wherein the determination of the confidence value is further based on the determining.

In Example 19, the subject matter of any one or more of Examples 16-18 optionally include the operations further comprising determining a file type of the image, wherein the determination of the confidence value is further based on the file type.

In Example 20, the subject matter of any one or more of Examples 16-19 optionally include the operations further comprising determining a reputation of the account, wherein the determination of the confidence value is further based on the reputation.

In Example 21, the subject matter of any one or more of Examples 13-20 optionally include the operations further comprising stripping the metadata from the image, wherein the response further indicates the stripped image.

In Example 22, the subject matter of any one or more of Examples 13-21 optionally include the operations further comprising hashing the metadata, wherein the response further indicates the hashed metadata.

In Example 23, the subject matter of any one or more of Examples 13-22 optionally include wherein the metadata includes a digital signature, the operations further comprising validating the second device identifier based on the digital signature.

In Example 24, the subject matter of any one or more of Examples 13-23 optionally include the operations further comprising generating a first QR code, causing display, via the first session, of the QR code; analyzing the image to identify a second QR code; comparing the first QR code to the second QR code, wherein the response is generated to further indicate a result of the QR code comparison.

Example 25 is a non-transitory computer readable storage medium storing instructions that when executed configure hardware processing circuitry to perform operations comprising: receiving, from a device, authentication information for an account and a first device identifier of the device; establishing, based on the authentication information, a first session for the account with the device; receiving, via the first session, a request to create a listing for an item; receiving, via the first session, a request to associate an image with the listing, metadata for the image indicating a second device identifier of a device that captured the image; comparing the first device identifier with the second device identifier; establishing a second session for a second account; receiving, via the second session, a request for the listing; transmitting, via the second session, a response to the request, the response indicating a result of the comparison.

In Example 26, the subject matter of Example 25 optionally includes wherein the metadata further indicates a time of image capture, the operations further comprising performing a second comparison of the time of image capture and a present time, and wherein the response further indicates a result of the second comparison.

In Example 27, the subject matter of Example 26 optionally includes wherein the metadata further indicates a location of image capture, the operations further comprising performing a third comparison of the location of image capture and an address associated with the account, wherein the response further indicates a result of the third comparison.

In Example 28, the subject matter of Example 27 optionally includes the operations further comprising determining a confidence value based on the first, second, and third comparisons, wherein the response further indicates the confidence value.

In Example 29, the subject matter of Example 28 optionally includes the operations further comprising associating a first, second, and third weight with the first, second, and third comparisons respectively, wherein the determination of the confidence value is further based on the weights.

In Example 30, the subject matter of any one or more of Examples 28-29 optionally include the operations further comprising determining whether the image is a snapshot, a frame in a video, or a portion of a three dimensional model, wherein the determination of the confidence value is further based on the determining.

In Example 31, the subject matter of any one or more of Examples 28-30 optionally include the operations further comprising determining a file type of the image, wherein the determination of the confidence value is further based on the file type.

In Example 32, the subject matter of any one or more of Examples 28-31 optionally include the operations further comprising determining a reputation of the account, wherein the determination of the confidence value is further based on the reputation.

In Example 33, the subject matter of any one or more of Examples 25-32 optionally include the operations further comprising stripping the metadata from the image, wherein the response further indicates the stripped image.

In Example 34, the subject matter of any one or more of Examples 25-33 optionally include the operations further comprising hashing the metadata, wherein the response further indicates the hashed metadata.

In Example 35, the subject matter of any one or more of Examples 25-34 optionally include wherein the metadata includes a digital signature, the operations further comprising validating the second device identifier based on the digital signature.

In Example 36, the subject matter of any one or more of Examples 25-35 optionally include the operations further comprising generating a first QR code, causing display, via the first session, of the QR code; analyzing the image to identify a second QR code; comparing the first QR code to the second QR code, wherein the response is generated to further indicate a result of the QR code comparison.

Example 37 is an apparatus, comprising: means for receiving, from a device, authentication information for an account and a first device identifier of the device; means for establishing, based on the authentication information, a first session for the account with the device; means for receiving, via the first session, a request to create a listing for an item, means for receiving, via the first session, a request to associate an image with the listing, metadata for the image indicating a second device identifier of a device that captured the image; means for comparing the first device identifier with the second device identifier; means for establishing a second session for a second account; means for receiving, via the second session, a request for the listing; means for transmitting, via the second session, a response to the request, the response indicating a result of the comparison.

In Example 38, the subject matter of Example 37 optionally includes wherein the metadata further indicates a time of image capture, the apparatus further comprising means for performing a second comparison of the time of image capture and a present time, and wherein the response further indicates a result of the second comparison.

In Example 39, the subject matter of Example 38 optionally includes wherein the metadata further indicates a location of image capture, the apparatus further comprising means for performing a third comparison of the location of image capture and an address associated with the account, wherein the means for transmitting is configured to generate the response to further indicate a result of the third comparison.

In Example 40, the subject matter of Example 39 optionally includes means for determining a confidence value based on the first, second, and third comparisons, wherein the means for transmitting is configured to generate the response to further indicate the confidence value.

In Example 41, the subject matter of Example 40 optionally includes means for associating a first, second, and third weight with the first, second, and third comparisons respectively, wherein the means for determining the confidence value is configured to determine the confidence value further based on the weights.

In Example 42, the subject matter of any one or more of Examples 40-41 optionally include means for determining whether the image is a snapshot, a frame in a video, or a portion of a three-dimensional model, wherein the means for determining the confidence value is configured to determine the confidence value further based on output from the means for determining.

In Example 43, the subject matter of any one or more of Examples 40-42 optionally include means for determining a file type of the image, wherein the means for determining the confidence value is configured to determine the confidence value further based on the file type.

In Example 44, the subject matter of any one or more of Examples 40-43 optionally include means for determining a reputation of the account, wherein the determination of the confidence value is further based on the reputation.

In Example 45, the subject matter of any one or more of Examples 37-44 optionally include means for stripping the metadata from the image, wherein the response further indicates the stripped image.

In Example 46, the subject matter of any one or more of Examples 37-45 optionally include means for hashing the metadata, wherein the response further indicates the hashed metadata.

In Example 47, the subject matter of any one or more of Examples 37-46 optionally include wherein the metadata includes a digital signature, and the apparatus further comprises means for comprising validating the second device identifier based on the digital signature.

In Example 48, the subject matter of any one or more of Examples 37-47 optionally include means for generating a first QR code, causing display, via the first session, of the QR code; means for analyzing the image to identify a second QR code; means for comparing the first QR code to the second QR code, wherein the response is generated to further indicate a result of the QR code comparison.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B." "B but not A." and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

I claim:

1. A system, comprising:
   hardware processing circuitry;
   one or more hardware memories storing instructions that when executed configure the hardware processing circuitry to perform operations comprising:
   receiving, from a first device, authentication information for a first account and a first device identifier of the first device;
   establishing, at an electronic marketplace, based on the authentication information, a first session for the first account with the first device;
   receiving, via the first session, a request to create a listing for an item;
   receiving, via the first session, an image captured by a second device, including metadata associated with the image that includes a second device identifier of the second device that captured the image;
   associating the image with the listing;
   performing a first comparison of the second device identifier and one or more device identifiers associated with the first account to determine whether the second device that captured the image is associated with the first account;

generating a confidence indicator for the listing based on the determination whether the second device that captured the image is associated with the first account, the confidence indicator being indicative of whether a user associated with the first account is in physical possession of the item for the listing;

establishing, at the electronic marketplace, a second session for a second account;

receiving, via the second session, a request for the listing; and transmitting, via the second session, a response to the request, the response including the listing and the confidence indicator.

2. The system of claim 1, wherein the metadata further indicates a time of image capture, the operations further comprising performing a second comparison of the time of image capture and a present time, and wherein the confidence indicator is further based on a result of the second comparison.

3. The system of claim 2, wherein the metadata further indicates a location of image capture, the operations further comprising performing a third comparison of the location of image capture and an address associated with the first account, wherein the confidence indicator is further based on a result of the third comparison.

4. The system of claim 3, the operations further comprising determining a confidence value based on the first comparison, the second comparison, and the third comparison, wherein the confidence indicator includes the confidence value.

5. The system of claim 4, the operations further comprising associating a first weight, a second weight, and a third weight with the first comparison, the second comparison, and the third comparison respectively, wherein the determination of the confidence value is further based on the first weight, the second weight, and the third weight.

6. The system of claim 4, the operations further comprising determining whether the image is a snapshot, a frame in a video, or a portion of a three-dimensional model, wherein the determination of the confidence value is further based on the determining.

7. The system of claim 4, the operations further comprising determining a file type of the image, wherein the determination of the confidence value is further based on the file type.

8. The system of claim 4, the operations further comprising determining a reputation of the first account, wherein the determination of the confidence value is further based on the reputation.

9. The system of claim 1, wherein performing the first comparison comprises comparing the second device identifier to the first device identifier to determine whether the second device identifier is the same as the first device identifier.

10. The system of claim 1, wherein performing the first comparison comprises comparing the second device identifier to a third device identifier stored in association with an account identifier for the first account in a data structure to determine whether the second device identifier is the same as the third device identifier.

11. The system of claim 1, wherein the metadata includes a digital signature, the operations further comprising validating the second device identifier based on the digital signature.

12. The system of claim 1, the operations further comprising:
generating a first QR code;

causing display, via the first session, of the QR code;
analyzing the image to identify a second QR code; and
comparing the first QR code to the second QR code, wherein the confidence indicator is generated to further indicate a result of the QR code comparison.

13. A method performed by hardware processing circuitry, comprising:

receiving, from a first device, authentication information for a first account and a first device identifier of the first device;

establishing, at an electronic marketplace, based on the authentication information, a first session for the first account with the first device;

receiving, via the first session, a request to create a listing for an item;

receiving, via the first session, an image captured by a second device, including metadata associated with the image that includes a second device identifier of the second device that captured the image;

associating the image with the listing;

performing a first comparison of the second device identifier and one or more device identifiers associated with the first account to determine whether the second device that captured the image is associated with the first account;

generating a confidence indicator for the listing based on the determination whether the second device that captured the image is associated with the first account, the confidence indicator being indicative of whether a user associated with the first account is in physical possession of the item for the listing;

establishing, at the electronic marketplace, a second session for a second account;

receiving, via the second session, a request for the listing; and transmitting, via the second session, a response to the request, the response including the listing and the confidence indicator.

14. The method of claim 13, wherein the metadata further indicates a time of image capture, the method further comprising performing a second comparison of the time of image capture and a present time, and wherein the confidence indicator is further based on a result of the second comparison.

15. The method of claim 14, wherein the metadata further indicates a location of image capture, and the method further comprises performing a third comparison of the location of image capture and an address associated with the first account, wherein the confidence indicator is further based on a result of the third comparison.

16. The method of claim 15, further comprising determining a confidence value based on the first comparison, the second comparison, and the third comparison, wherein the confidence indicator includes the confidence value.

17. The method of claim 16, further comprising associating a first weight, a second weight, and a third weight with the first comparison, the second comparison, and the third comparison respectively, wherein the determination of the confidence value is further based on the first weight, the second weight, and the third weight.

18. The method of claim 16, further comprising determining a reputation of the first account, wherein the determination of the confidence value is further based on the reputation.

19. The method of claim 13, further comprising:
generating a first QR code;
causing display, via the first session, of the QR code;

analyzing the image to identify a second QR code; and
comparing the first QR code to the second QR code, wherein the confidence indicator is generated to further indicate a result of the QR code comparison.

20. A non-transitory computer readable storage medium storing instructions that when executed configure hardware processing circuitry to perform operations comprising:

receiving, from a first device, authentication information for a first account and a first device identifier of the first device;

establishing, at an electronic marketplace, based on the authentication information, a first session for the first account with the first device;

receiving, via the first session, a request to create a listing for an item;

receiving, via the first session, an image captured by a second device, including metadata associated with the image that includes a second device identifier of the second device that captured the image;

associating the image with the listing;

performing a first comparison of the second device identifier and one or more device identifiers associated with the first account to determine whether the second device that captured the image is associated with the first account;

generating a confidence indicator for the listing based on the determination whether the second device that captured the image is associated with the first account, the confidence indicator being indicative of whether a user associated with the first account is in physical possession of the item for the listing;

establishing, at the electronic marketplace, a second session for a second account;

receiving, via the second session, a request for the listing; and transmitting, via the second session, a response to the request, the response including the listing and the confidence indicator.

* * * * *